US009690849B2

(12) United States Patent
Shah et al.

(10) Patent No.: US 9,690,849 B2
(45) Date of Patent: Jun. 27, 2017

(54) SYSTEMS AND METHODS FOR DETERMINING ATYPICAL LANGUAGE

(71) Applicant: THOMSON REUTERS GLOBAL RESOURCES, Baar (CH)

(72) Inventors: Sameena Shah, White Plains, NY (US); Dietmar Dorr, Sunnyvale, CA (US); Khalid Al-Kofahi, Rosemount, MN (US); Jacob Sisk, Brooklyn, NY (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 592 days.

(21) Appl. No.: 14/201,134

(22) Filed: Mar. 7, 2014

(65) Prior Publication Data

US 2014/0344279 A1 Nov. 20, 2014

Related U.S. Application Data

(63) Continuation-in-part of application No. 13/249,760, filed on Sep. 30, 2011, now Pat. No. 9,305,082.

(60) Provisional application No. 61/774,863, filed on Mar. 8, 2013.

(51) Int. Cl.

| | |
|---|---|
| ***G06F 17/00*** | (2006.01) |
| ***G06F 17/30*** | (2006.01) |
| ***G06F 17/27*** | (2006.01) |
| ***G06Q 10/10*** | (2012.01) |
| *G06Q 50/18* | (2012.01) |

(52) U.S. Cl.

CPC ...... *G06F 17/30705* (2013.01); *G06F 17/277* (2013.01); *G06F 17/2735* (2013.01); *G06F 17/30699* (2013.01); *G06Q 10/10* (2013.01); *G06Q 50/18* (2013.01)

(58) Field of Classification Search

CPC ....................... G06F 17/2785; G06F 17/30699

See application file for complete search history.

(56) References Cited

U.S. PATENT DOCUMENTS

| | | | | |
|---|---|---|---|---|
| 5,696,962 | A * | 12/1997 | Kupiec | G06F 17/30672 |
| 5,893,134 | A * | 4/1999 | O'Donoghue | G06F 17/2827 704/8 |
| 9,152,454 | B2 * | 10/2015 | Holembowski | G05B 19/05 |
| 2003/0101169 | A1 * | 5/2003 | Bhatt | G06F 17/30569 |
| 2005/0027704 | A1 * | 2/2005 | Hammond | G06F 17/30699 |

(Continued)

*Primary Examiner* — Laurie Ries

(57) ABSTRACT

A method includes analyzing a cluster of conceptually-related portions of text to develop a model and calculating a novelty measurement between a first identified conceptually-related portion of text and the model. The method further includes transmitting a second identified conceptually-related portion of text and a score associated with the novelty measurement from a server to an access device via a signal. Another method includes determining at least two corpora of conceptually-related portions of text. The method also includes calculating a common neighbors similarity measurement between the at least two corpora of conceptually-related portions of text and if the common neighbors similarity measurement exceeds a threshold, merging the at least two corpora of conceptually-related portions of text into a cluster or if the common neighbors similarity measurement does not exceed a threshold, maintaining a non-merge of the at least two corpora of conceptually-related portions of text.

14 Claims, 16 Drawing Sheets

200
202 DETERMINE AT LEAST TWO CORPORA OF CONCEPTUALLY-RELATED PORTIONS OF TEXT
204 CALCULATING A COMMON NEIGHBORS SIMILARITY MEASUREMENT BETWEEN THE AT LEAST TWO CORPORA OF CONCEPTUALLY-RELATED PORTIONS OF TEXT
206 DOE THE COMMON NEIGHBORS SIMILARITY MEASUREMENTS EXCEED A THRESHOLD?
YES
NO
202a MERGING THE AT LEAST TWO CORPORA OF CONCEPTUALLY-RELATED PORTIONS OF TEXT INTO A CLUSTER
202b MAINTAINING A NON-MERGE OF THE AT LEAST TWO CORPORA OF CONCEPTUALLY-RELATED PORTIONS OF TEXT
208 ANALYZE THE CLUSTER OF CONCEPTUALLY-RELATED PORTIONS OF TEXT TO DEVELOP A MODEL
210 CALCULATE A NOVELTY MEASUREMENT BETWEEN A FIRST IDENTIFIED CONCEPTUALLY-REALTED PORTION OF TEXT AND THE MODEL
212 TRANSMIT A SECOND IDENTIFIED CONCEPTUALLY-RELATED PORTION OF TEXT AND A SCORE ASSOCIATED WITH THE NOVELTY MEASUREMENT FROM A SERVER 120 TO AN ACCESS DEVICE 130 VIA A SIGNAL 150

(56) References Cited

U.S. PATENT DOCUMENTS

2005/0278325 A1* 12/2005 Mihalcea .............. G06F 17/277
2006/0224584 A1* 10/2006 Price ................. G06F 17/30616
2007/0016571 A1* 1/2007 Assadian .......... G06F 17/30687
2009/0307183 A1* 12/2009 Vigen ............... G06F 17/30616
2011/0306845 A1* 12/2011 Osorio .................. G06F 19/345
600/300
2012/0054226 A1* 3/2012 Cao ................... G06F 17/30941
707/769
2012/0137367 A1* 5/2012 Dupont ................... G06F 21/00
726/25
2012/0290950 A1* 11/2012 Rapaport ................ H04L 51/32
715/753
2013/0031117 A1* 1/2013 Mandelstein ..... G06F 17/30914
707/758

* cited by examiner

500
Sign Off
Client APPL
Folders
History
CM Research (0)
Westlaw Business
executive /3 emplyment
Search
Market Standards Service (10,000)
Market Standard Index
NARROW:
Search within results:
Filing date
XX Code
Law Firm
EXHIBITS & EXECUTIVE EMPLOYMENT AGREEMENT
9.7
9.1
8.3
THOMSON REUTERS

FIG. 6

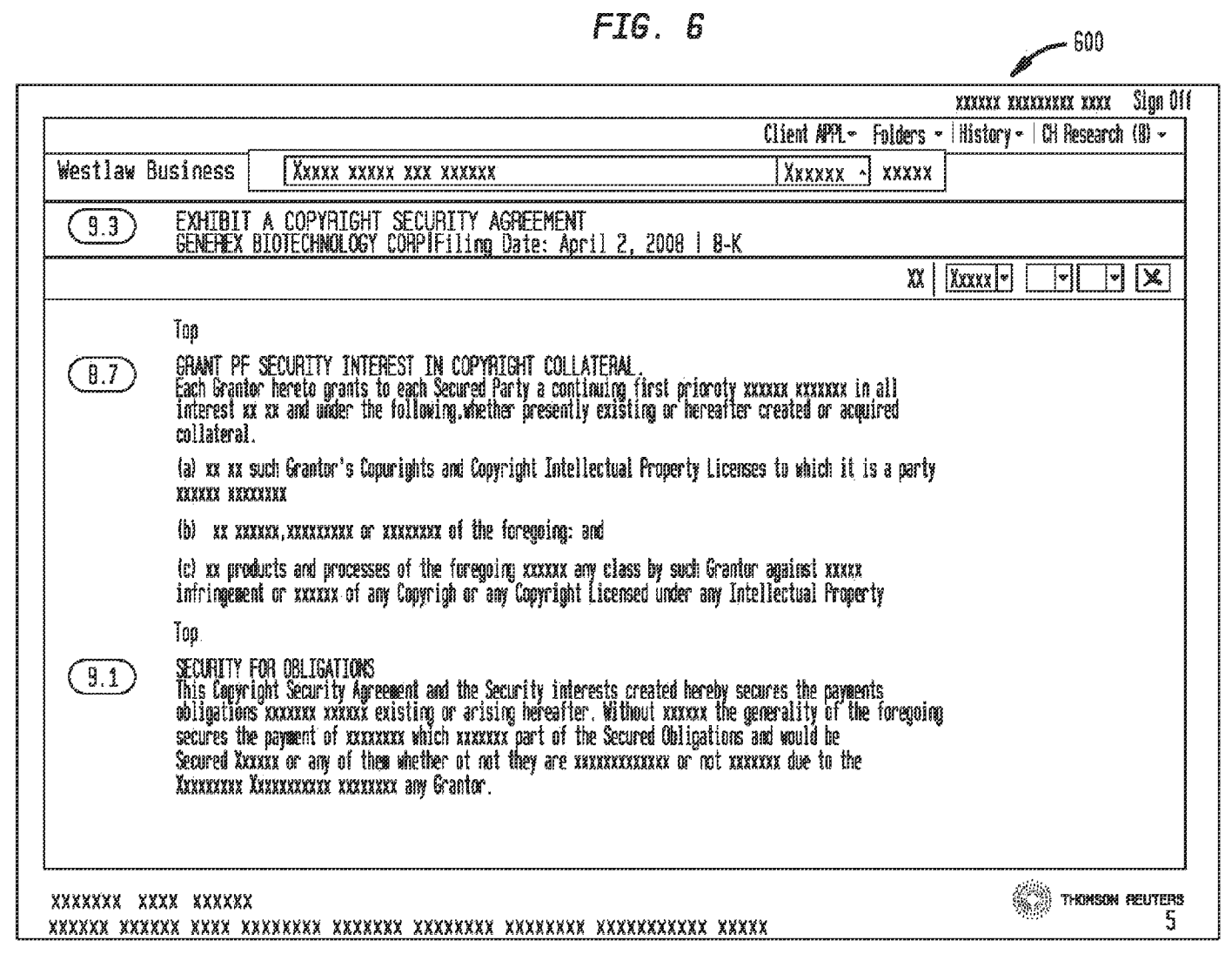

600 xxxxxx xxxxxxxxx xxxx Sign Off

Client APPL Folders History CH Research (8)

Westlaw Business | Xxxxx xxxxx xxx xxxxxx | Xxxxxx | xxxxx 9.3 EXHIBIT A COPYRIGHT SECURITY AGREEMENT
GENEREX BIOTECHNOLOGY CORP|Filing Date: April 2, 2008 | 8-K XX | Xxxxx Top 8.7 GRANT PF SECURITY INTEREST IN COPYRIGHT COLLATERAL.
Each Grantor hereto grants to each Secured Party a continuing first prioroty xxxxxx xxxxxxx in all interest xx xx and under the following,whether presently existing or hereafter created or acquired collateral.

(a) xx xx such Grantor's Copurights and Copyright Intellectual Property Licenses to which it is a party xxxxxx xxxxxxxx (b) xx xxxxxx,xxxxxxxxx or xxxxxxxx of the foregoing: and (c) xx products and processes of the foregoing xxxxxx any class by such Grantor against xxxxx infringement or xxxxxx of any Copyrigh or any Copyright Licensed under any Intellectual Property Top.

9.1 SECURITY FOR OBLIGATIONS
This Copyright Security Agreement and the Security interests created hereby secures the payments obligations xxxxxxx xxxxxx existing or arising hereafter. Without xxxxxx the generality of the foregoing secures the payment of xxxxxxxx which xxxxxxx part of the Secured Obligations and would be Secured Xxxxxx or any of them whether ot not they are xxxxxxxxxxxxx or not xxxxxxx due to the Xxxxxxxxx Xxxxxxxxxxx xxxxxxxx any Grantor.

XXXXXXX XXXX XXXXXX
XXXXXX XXXXXX XXXX XXXXXXXX XXXXXXX XXXXXXXX XXXXXXXX XXXXXXXXXXX XXXXX

THOMSON REUTERS
5

PNL ON SHORTING STOCKS WITH EXTREME LANGUAGE

FIG. 9

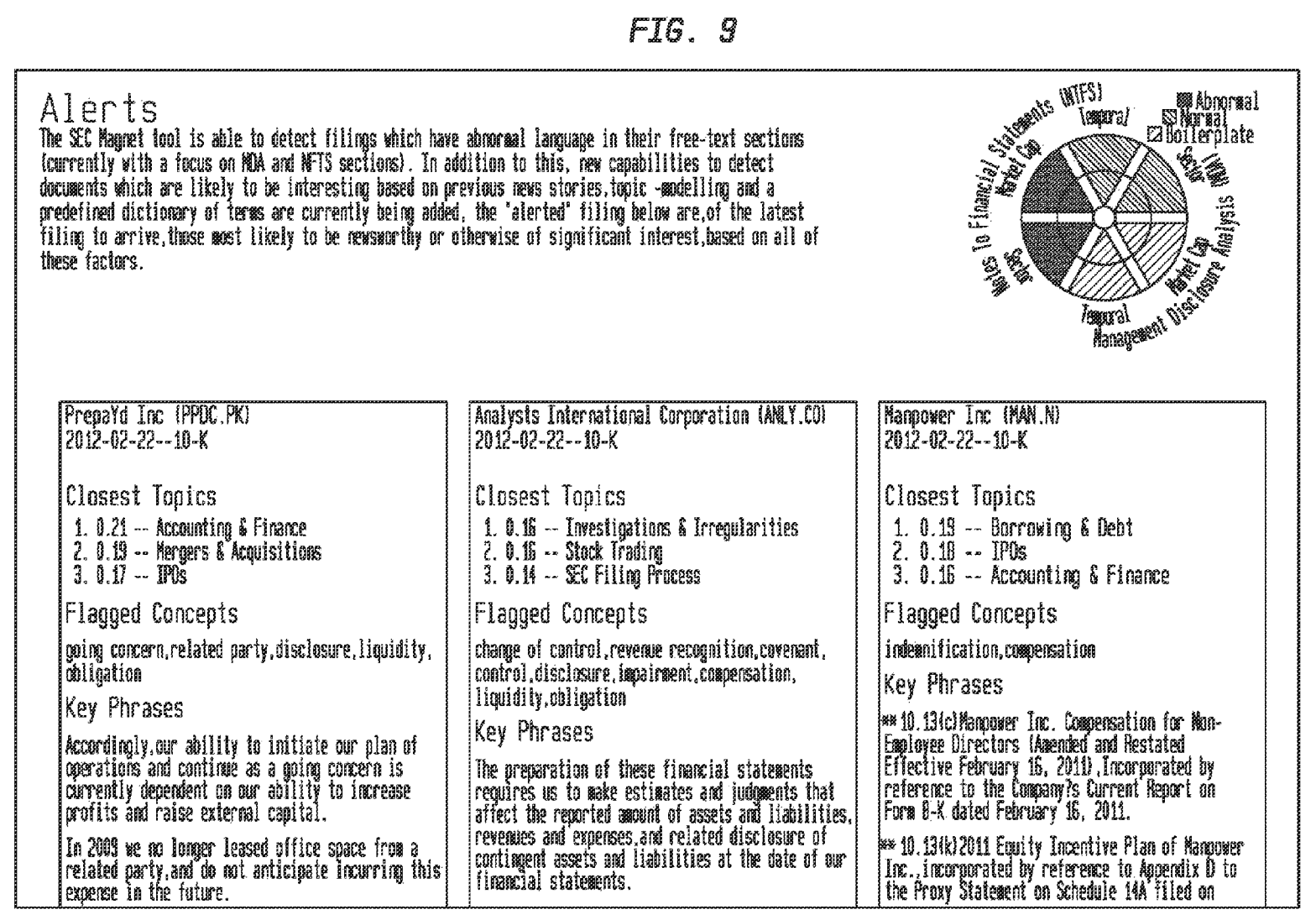

Alerts

The SEC Magnet tool is able to detect filings which have abnormal language in their free-text sections (currently with a focus on MDA and NFTS sections). In addition to this, new capabilities to detect documents which are likely to be interesting based on previous news stories, topic -modelling and a predefined dictionary of terms are currently being added, the 'alerted' filing below are, of the latest filing to arrive, those most likely to be newsworthy or otherwise of significant interest, based on all of these factors.

Notes To Financial Statements (NTFS)
Temporal
Market Cap
Sector
Management Disclosure Analysis (MDA)
Temporal
Market Cap
Sector
Abnormal
Normal
Boilerplate PrepaYd Inc (PPDC.PK)
2012-02-22--10-K

Closest Topics 1. 0.21 -- Accounting & Finance
2. 0.19 -- Mergers & Acquisitions
3. 0.17 -- IPOs

Flagged Concepts going concern, related party, disclosure, liquidity, obligation

Key Phrases

Accordingly, our ability to initiate our plan of operations and continue as a going concern is currently dependent on our ability to increase profits and raise external capital.

In 2009 we no longer leased office space from a related party, and do not anticipate incurring this expense in the future.

Analysts International Corporation (ANLY.CO)
2012-02-22--10-K

Closest Topics 1. 0.16 -- Investigations & Irregularities
2. 0.16 -- Stock Trading
3. 0.14 -- SEC Filing Process

Flagged Concepts change of control, revenue recognition, covenant, control, disclosure, impairment, compensation, liquidity, obligation

Key Phrases

The preparation of these financial statements requires us to make estimates and judgments that affect the reported amount of assets and liabilities, revenues and expenses, and related disclosure of contingent assets and liabilities at the date of our financial statements.

Manpower Inc (MAN.N)
2012-02-22--10-K

Closest Topics 1. 0.19 -- Borrowing & Debt
2. 0.18 -- IPOs
3. 0.16 -- Accounting & Finance

Flagged Concepts indemnification, compensation

Key Phrases

** 10.13(c)Manpower Inc. Compensation for Non-Employee Directors (Amended and Restated Effective February 16, 2011), Incorporated by reference to the Company?s Current Report on Form 8-K dated February 16, 2011.

** 10.13(k)2011 Equity Incentive Plan of Manpower Inc., incorporated by reference to Appendix D to the Proxy Statement on Schedule 14A filed on

*FIG. 10*

Search

SEC Magnet tool was originally designed to highlight SEC filings which were deemed abnormal
ngst their peers according to a number of language models generated over the corpus of existing
and 10-Q filings. A second initiative has allowed for a dictionary of terms known to signify
esting filings to be added to this language model, together with a novel set of features, which will
interesting filings to be discovered according to both statistical anomaly and expert information.
search tool offers a third option to users, simply indexing the next of the MDA and NFTS sections of
s and presenting it through a standard search engine experience.

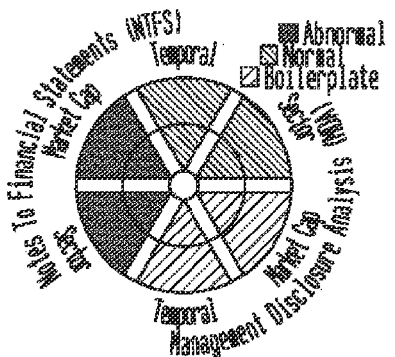

PICK A METHOD OF SEARCH:

| Basic | Advanced | Proximity | Fuzzy | Random |
|---|---|---|---|---|

For hard-to-spell terms

Keyword(s):

Only 10-Ks?

Similarity threshold: 0.8 Please enter a value between 0 and 1

Submit Query

SEARCH RESULTS FOR'+CONTENTS:SUBPOENA~0.5'

FIG. 11

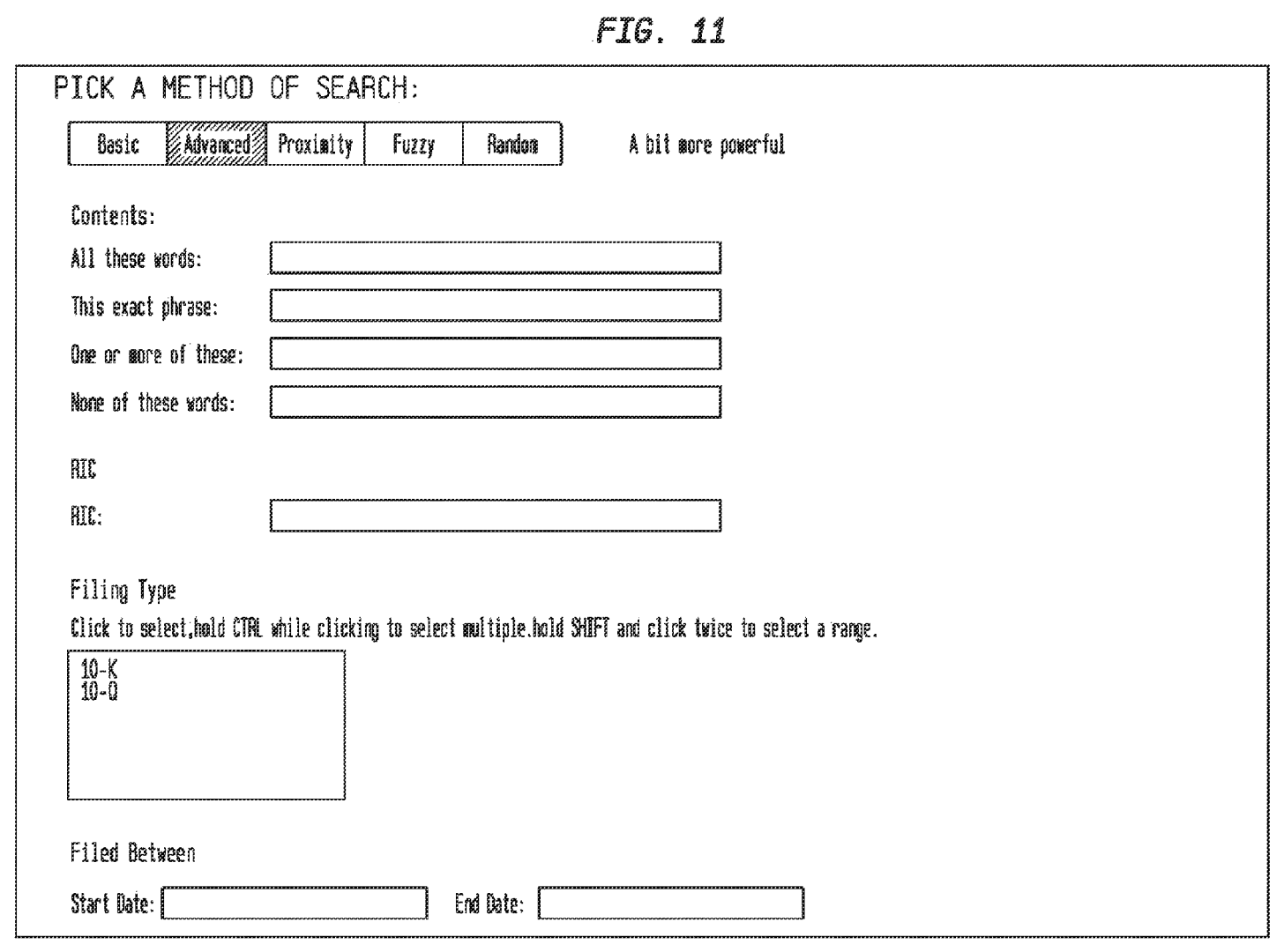

PICK A METHOD OF SEARCH:

Basic | Advanced | Proximity | Fuzzy | Random

A bit more powerful

Contents:

All these words:

This exact phrase:

One or more of these:

None of these words:

RIC

RIC:

Filing Type

Click to select,hold CTRL while clicking to select multiple.hold SHIFT and click twice to select a range.

10-K
10-Q

Filed Between

Start Date: End Date:

FIG. 12

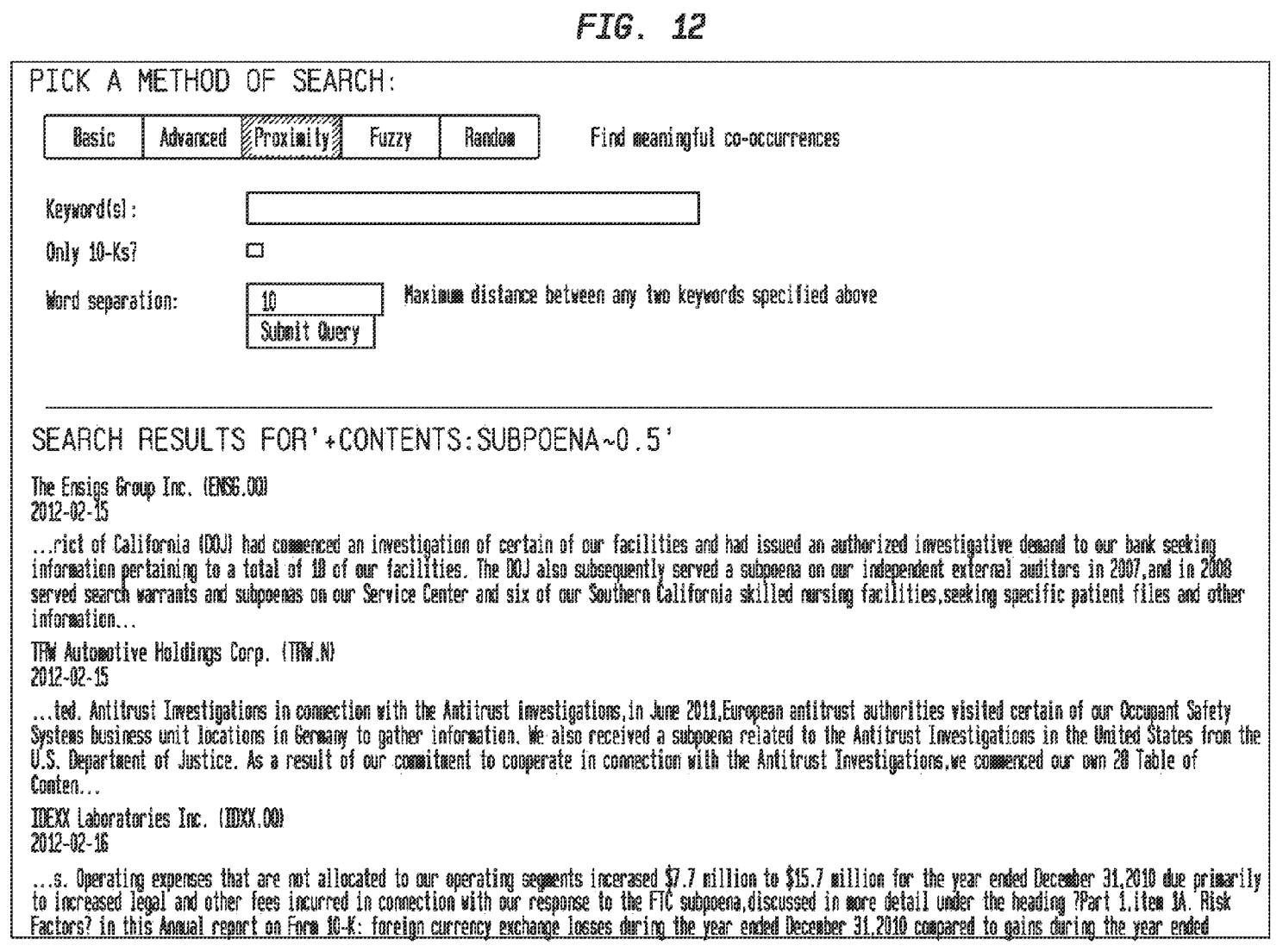

PICK A METHOD OF SEARCH:

Basic | Advanced | Proximity | Fuzzy | Random

Find meaningful co-occurrences

Keyword(s):

Only 10-Ks?

Word separation: 10 Maximum distance between any two keywords specified above

Submit Query

SEARCH RESULTS FOR'+CONTENTS:SUBPOENA~0.5'

The Ensigs Group Inc. (ENSG.OO)
2012-02-15

...rict of California (DOJ) had commenced an investigation of certain of our facilities and had issued an authorized investigative demand to our bank seeking information pertaining to a total of 10 of our facilities. The DOJ also subsequently served a subpoena on our independent external auditors in 2007,and in 2008 served search warrants and subpoenas on our Service Center and six of our Southern California skilled nursing facilities,seeking specific patient files and other information...

TRW Automotive Holdings Corp. (TRW.N)
2012-02-15

...ted. Antitrust Investigations in connection with the Antitrust investigations,in June 2011,European antitrust authorities visited certain of our Occupant Safety Systems business unit locations in Germany to gather information. We also received a subpoena related to the Antitrust Investigations in the United States from the U.S. Department of Justice. As a result of our commitment to cooperate in connection with the Antitrust Investigations,we commenced our own 28 Table of Conten...

IDEXX Laboratories Inc. (IDXX.OO)
2012-02-16

...s. Operating expenses that are not allocated to our operating segments increased $7.7 million to $15.7 million for the year ended December 31,2010 due primarily to increased legal and other fees incurred in connection with our response to the FTC subpoena,discussed in more detail under the heading ?Part 1.Item 1A. Risk Factors? in this Annual report on Form 10-K: foreign currency exchange losses during the year ended December 31,2010 compared to gains during the year ended

SYSTEMS AND METHODS FOR DETERMINING ATYPICAL LANGUAGE

CROSS-REFERENCE TO RELATED APPLICATION

This application claims priority to U.S. patent application Ser. No. 13/249,760 filed Sep. 30, 2011 entitled "Systems, methods and Interfaces for Analyzing Conceptually-Related Portions of Text," and U.S. Provisional Application No. 61/774,863 filed Mar. 8, 2013, entitled "Language Models of SEC Filings: Determination of Atypical Language and Market Impact", the contents of which are incorporated herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright© 2014 Thomson Reuters.

TECHNICAL FIELD

This disclosure relates generally to the analysis of text. More specifically, the disclosure is directed towards systems and methods for analyzing document text, in particular in financial documents, in order to determine atypical language.

BACKGROUND

Interacting with documents is an everyday part of life. For example, renters and landlords may sign a written contract (i.e., a lease) to establish each party's rights and responsibilities with respect to the property being rented. A home purchase typically requires the buyer's signature on multiple documents/contracts to establish the buyer's responsibility to pay the mortgage and not rescind the offer that was agreed upon and the seller's responsibility that the seller keeps the promises that were warranted. Consumers download a piece of software on their computers and have to click "I Agree" to accept the terms of an end user license agreement. Employees sign an employment agreement binding them to the company's rules and regulations while employed and sometimes, thereafter.

Interacting with documents is of course also a frequent occurrence in the professional world. For example in the business world, all public companies, domestic and foreign, trading on any of the US exchanges, are required to file registration statements, periodic reports, and other forms describing any significant changes to the US Securities and Exchange Commission ("SEC"). Filings typically contain financial statements as well as large amounts of 'unstructured text' describing the past, present and anticipated future for the firm. Corporate filings provide a central window into the health of the filing company, and thus investors consider them immensely important.

One of the most important corporate filing is the SEC Form 10K. All US companies are obligated to file a Form 10-K within 90 days after the end of their fiscal year. 10-Ks are much more detailed than the annual reports sent to shareholders. Most pages of a 10-K include unstructured, qualitative descriptions about various aspects of the company and hence a very useful context for understanding the financial data. For example, a company should mention if the earnings being reported might have been inflated because of a change in its accounting method or expenses shifted to a later period, or if extra sales were included because of a change in its fiscal end, or whether revenues not yet receivable were included in the computation, or impact of certain expensed/capitalized items. Ideally, explanation of all such changes that lead to different interpretations of the financial statements should be included in the Notes to Financial Statements ("NTFS"). Detailed analyses of risks that the company faces and their potential impact should be included in the Management Discussion and Analysis ("MD&A") section. It is also intended to assess a company's liquidity, capital resources, and operations. Hence, it is one of the most read and most important components of the financial statements.

Since the text in different filing types is a means of communication from the management to the investors, these textual disclosures provide a means to assess managers' behavioral biases and understand firm behavior. It is also important to have a method to maintain the history of the behavioral biases of managers or investors for future backtests and research. A careful consideration of the textual information has become even more important since the advent of XBRL, since it provided a structure to the numeric information, and hence encouraged the possibility of shifting gray areas of accounting to the textual information. However, this lack of a consistent format coupled with the fact that textual information is hard to quantify, makes it a challenging automated task and hence requires domain experts to interpret it.

Currently, a known approach to analyzing documents, such as contracts and contract clauses or financial documents includes a manual component of asking another person, perhaps someone with more expertise on the subject, which language is best for the situation. While having access to this type of expertise may provide some benefit, the person drafting the contract may not have time to reach out to another individual and/or that individual might be too busy to lend his/her expertise. In addition, the individual being asked may know more about the area than the person drafting but may not be a true expert.

Another known approach is looking through other documents, such as other contracts and contract clauses or other financial documents. For example, some law firms might have a document repository where all the contracts are stored. A lawyer searches the repository to bring up a particular set of contracts and/or contract clauses that might be applicable to the client's situation. However, this type of system does not analyze the contracts and contract clauses to determine what might be the "market standard" language. Market standard language refers to language that is generally accepted by members of a market. For example, the market standard language for a non-compete clause in a salesperson's employment agreement might be different than the market standard language for a non-compete clause in an engineer's employment agreement.

Additionally, each known approach described above consumes a tremendous amount of valuable time. For example, when attempting to engage an individual with more expertise, the drafter may have to work around the individual's schedule which may be cumbersome and time consuming. In addition, that individual may not have the time necessary to discuss the various options of contract language. In another example, when searching other contracts and clauses, several precious hours may be wasted trying to find the necessary language for the drafter's scenario with the potential for little to no success. This practice is inconvenient and wastes multiple hours of researching language instead of focusing on other important aspects like, for example, the discussion and negotiation with opposing counsel.

Further most institutions, such as investment firms, do not have dedicated analysts who can speedily unearth any inaccuracies, management latitude, or resources dedicated to interpreting text that is just very hard to read. Apart from speed, the breath of the companies covered is also limited at best. An automated system can overcome the speed and coverage challenges, but the fact that textual information in corporate filings is largely unstructured is an additional challenge. Unstructured information neither has a pre-defined data model nor fits well into relational tables. Even though the text may be physically organized into sections and subsections, such as the Notes to the Financial Statements in a SEC filing. Yet, from the perspective of information processing, it is unstructured because of irregularities and ambiguities that make it difficult to automate processing. Compared to data stored in a structured data model like a database or annotated/tagged documents, it is typical for unstructured text to be higher dimensional and require further pre-processing.

Accordingly, the inventors have recognized the necessity for additional improvements in analyzing conceptually-related portions of text, in particular contracts and contract clauses.

SUMMARY

The present disclosure allows for analyzing a cluster of conceptually-related portions of text (e.g., a cluster of contracts or financial documents) to develop a model document. Then the model document is used to calculate a novelty measurement between an individual document and the model document. Finally, the individual document may be transmitted and ultimately displayed to the user along with a score that is associated with the corresponding novelty measurement. Additionally, the disclosure permits determining two corpora of documents and calculating a common neighbors similarity measurement between the two corpora of documents. Furthermore, if the common neighbors similarity measurement exceeds a threshold, the two corpora of documents are merged into a cluster. However, if the common neighbors similarity measurement does not exceed a threshold, the two corpora of documents do not merge and maintain separate corpora of documents.

The systems, methods and interfaces described herein advantageously provide direct access to a large corpus of documents that are analyzed and scored for conformity and/or novelty to market standard document language. Each clause or section of the document is scored, as is each document. Advantageously, the disclosure allows users (e.g. attorneys, paralegals, contract negotiators and managers, financial analysts, traders and other legal and business professionals) to identify the market standard language for an document and its clause or section types in order to: 1) help professionals manage and possibly avoid risk for their clients by giving them confidence in each clause of the document as well as in the document they have drafted or reviewed: 2) save time, effort, and energy; and 3) allow professionals to focus on practicing their profession. In addition, the disclosure allows a user (e.g., an attorney) the flexibility to search documents, such as contracts and contract clauses, to determine what type of language is best for the user's situation. Furthermore, the disclosure allows one to look at scores that indicate a significant deviation from the market standard in case a professional needs to find specific non-market standard language.

BRIEF DESCRIPTION OF THE DRAWINGS

FIG. 6 is an exemplary interface 600 which corresponds to one or more embodiments of the disclosure;

FIG. 9 is an exemplary interface which corresponds to one or more embodiments of the disclosure;

FIG. 10 is an exemplary interface which corresponds to one or more embodiments of the disclosure;

FIG. 11 is an exemplary interface which corresponds to one or more embodiments of the disclosure;

FIG. 12 is an exemplary interface which corresponds to one or more embodiments of the disclosure.

Like reference symbols in the various drawings indicate like elements.

DETAILED DESCRIPTION OF THE EXEMPLARY EMBODIMENT(S)

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

The description includes many terms with meanings derived from their usage in the art or from their use within the context of the description. However, as a further aid, the following examples are presented. The term "conceptually-related portion of text" or "conceptually-related portions of text" includes but is not limited to words, sentences, paragraphs, clauses, and/or documents. Types of conceptually-related portions of text may include contract clauses, contracts, contract sentences, financial document clauses such as SEC filing clauses, financial document sentences such as SEC filing sentences, financial documents such as SEC filing documents and/or any portion of text that could be clustered into a taxonomy. The term "corpus" includes a grouping of conceptually-related portions of text. The term "corpora" is the plural of the term "corpus" and may include a cluster. The term "cluster" includes a merged set of at least two corpora of conceptually-related portions of text. The term "common neighbors similarity measurement" is the probability that two corpora share similar neighbors. Thus, if the neighbors of the two corpora are similar then the two corpora are similar. The term "novelty measurement" is a value of how novel (i.e., new) the first identified conceptually-related portion of text is from the model. Put another way, how different is the wording of the first identified conceptually-related portion of text from the model. In some embodiments, the novelty measurement is a value between or including 0 and 1. The term "model" is a statistical language model that assigns a probability to a sequence of X words. The term "score" is a value that is associated with a novelty measurement. Exemplary scores include document scores, such as contract scores, and document clause scores or document section scores, such as contract clause scores that are associated with their respective novelty measurements. The term "first identified conceptually-related portion of text" includes a conceptually-related portion of text that is being used to calculate a novelty measurement. The term "second identified conceptually-related portion of text" includes a conceptually-related portion of text that is being transmitted to an access device.

Exemplary System

Figure 1:
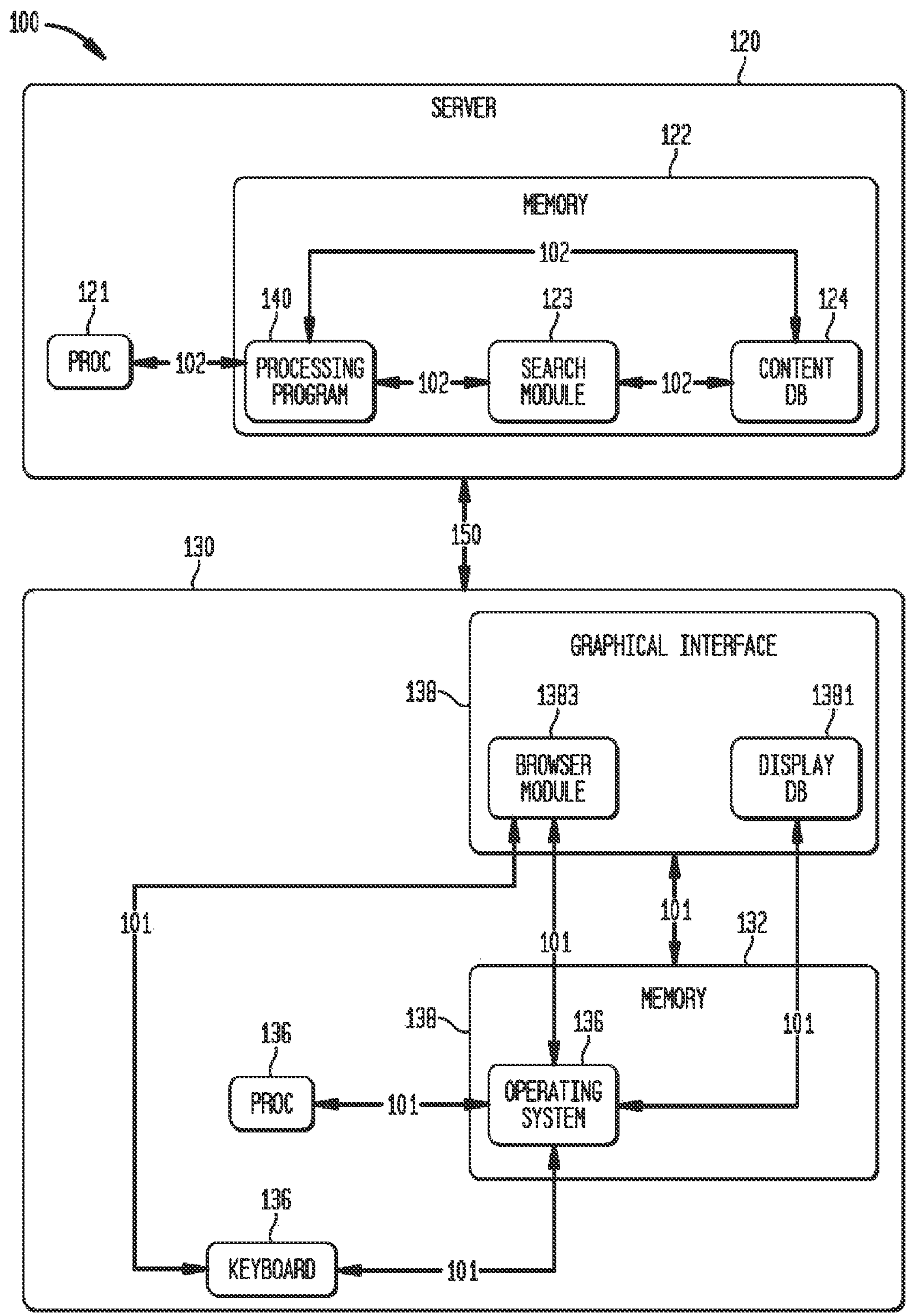
FIG. 1 is an exemplary system 100 which corresponds to one or more embodiments of the disclosure.

FIG. 1 shows an exemplary system 100, which may be adapted to incorporate the capabilities, functions, methods, and interfaces of the present disclosure. The computing system 100 is only one example and is not intended to suggest any limitation as to the scope of use or functionality of the disclosure. Neither should the computing system 100 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, etc. that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

In one embodiment, with reference to FIG. 1, the system 100 includes a server 120 and an access device 130. Server 120 is generally representative of one or more servers for serving data in the form of a webpage or other markup language with associated applets, ActiveX controls, and/or other related software and data structures. Server 120 includes a processor 121 and a memory 122, wherein the memory 122 further includes a processing program module 140, a search module 123, and a content database 124. All of the components within server 120 are connected via computer bus 102, which is shown in various pathways. Computer buses 101, 102 and/or 103 are buses that transmit information between the access device's components/elements and/or between multiple access devices. For example, computer bus 101 and computer bus 102 aid in transmitting information (e.g., a signal) between access device 130 and server 120. Processor 121 may use computer bus 102 to queue a request that is to be transmitted through a signal, from server 120, via a wireless or wireline transmission channel 150 and is then ultimately received by processor 131 through the utilization of computer bus 101. Generally, server 120 transmits the signal via a wireless or wireline transmission channel 150 to at least one access device, such as access device 130. Supplementing the previous example, the signal from server 120 may be associated with a request to display a second identified conceptually-related portion of text and a score associated with the novelty measurement on access device 130.

Processor 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores a search module 123, a content database 124 and a processing program 140.

Search module 123 includes one or more search engines and related user-interface components (not shown), for receiving and processing queries against content database 124. Content database 124 takes the exemplary form of one or more electronic, magnetic, and/or optical data-storage devices. Content database 124 includes content relating to conceptually-related portions of text, data associated with conceptually-related portion of text and/or a sub-set of content that only includes subscriber content. Subscriber content includes content and related data for controlling, administering, and managing pay-as-you-go and/or subscription based access. For instance, a user may have to subscribe to an information retrieval service (e.g., Westlaw Business). The content is stored in the content database 124 and cannot be accessed until a set of user credentials are authenticated. For instance, user credentials may be a user name and associated password. Once the credentials are successfully authenticated on server 120, the signal, including a second identified conceptually-related portion of text and a score associated with the novelty measurement, is transmitted via the wireless or wireline transmission channel 150 to access device 130. For purposes described herein, successfully authenticating a set of user credentials means the user credentials were accepted by an authentication system (not shown but well known to those skilled in the art). This successful authentication allows for receiving and/or transmitting the identified conceptually-related portion of text and the score associated with the novelty measurement.

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® iPad, and/or any other device capable of providing an effective user interface with a server and/or database. Specifically, in this exemplary embodiment, access device 130 is a mobile access device which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor 131 reads data, instructions, messages or message packets, and other computer readable information from the computer readable medium.

In one exemplary embodiment, memory 132 stores code (machine-readable or executable instructions) for an operating system 136. Operating system 136 is coupled to a graphical interface 138 and other various components thereof, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134 and the processor 131. For example, the keyboard 134 sends inputs, via computer bus 101, to the operating system 136. The operating system 136 then determines the processing program 140 needs to be utilized, engages the processing program 140 through the signal via a wireless or wireline transmission channel 150, accepts the processing program output as data and stores that data temporarily in memory 132 (e.g., RAM). Operating system 136 and browser 1383 not only receive inputs from keyboard 134, but also support rendering of graphical user interfaces within graphical interface 138.

Graphical interface 138 includes a browser 1383 and a display 1381. When the processing program 140 is initiated, a display 1381 is defined in memory 132 and rendered on graphical interface 138. Upon rendering, the graphical interface 138 presents the data/results in association with the set of instructions from the processing program 140 as further discussed herein.

Figure 1A:
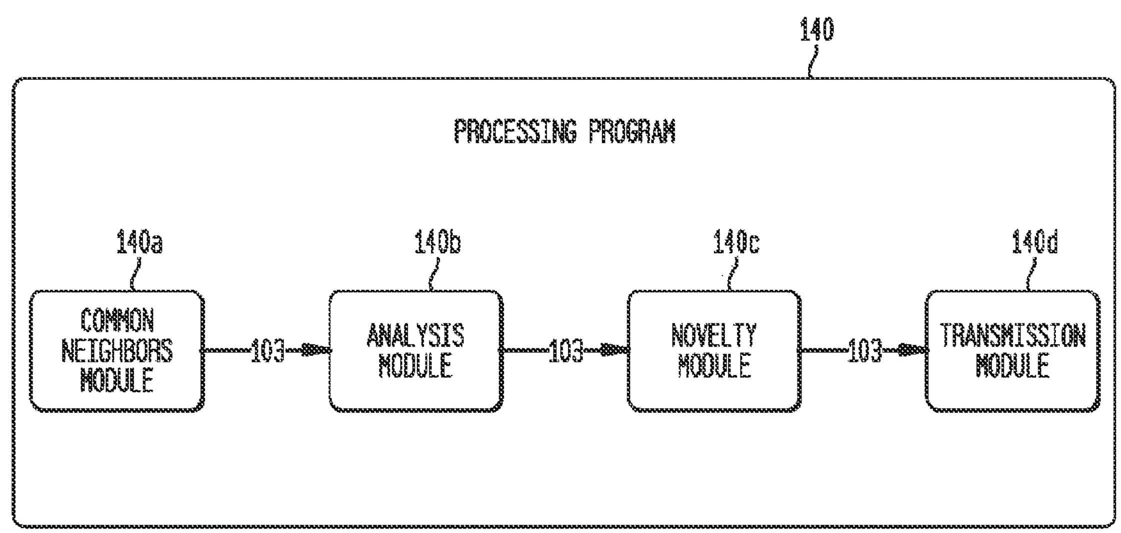
FIG. 1A is a more detailed view of the processing program 140 of FIG. 1 which corresponds to one or more embodiments of the disclosure.

FIG. 1A illustrates an exemplary embodiment of a processing program 140. The processing program 140 is configured to execute a set of modules from memory 122. The modules include a common neighbors module 140*a*, an analysis module 140*b*, a novelty module 140*c*, and a transmission module 140*d*. Each module is described herein. The common neighbors module 140*a* is configured to determine at least two corpora of conceptually-related portions of text. The common neighbors module 140*a* is also configured to calculate a common neighbors similarity measurement between the at least two corpora of conceptually-related portions of text. The method for calculating the common neighbors similarity measurement is further described herein. If the common neighbors similarity measurement exceeds a threshold, the common neighbors module 140*a* is configured to merge the at least two corpora of conceptually-related portions of text into a cluster. A threshold is determined such that only a high-value common neighbor similarity measurement proceeds to merge the two corpora. For example, a threshold may range from 0 to 1. Having the common neighbors similarity measurement meet or surpass a high threshold (i.e., closer to 1) gives a strong indication that the two corpora should be merged due to similarity. Having the common neighbors similarity measurement meet a lower the threshold (i.e., closer to 0) does not give the same indication of comfort that the two corpora should be merged. Therefore, a higher threshold may provide a more precise and accurate merging of corpora. Techniques for determining a threshold are well known to those skilled in the art. On the other hand, if the common neighbors similarity measurement does not exceed a threshold, the common neighbors module 140*a* is configured to maintain a non-merge of the at least two corpora of conceptually-related portions of text. For example, the common neighbors module 140*a* is configured to determine at least two corpora of documents, such as two corpora of contracts. The common neighbors similarity measurement between the two corpora of documents is calculated and a determination is made on whether the calculation exceeds the threshold. If the calculation exceeds the threshold, the two corpora of contracts are merged into a cluster. If the calculation does not exceed the threshold, the two corpora of documents remain separate corpora. In another example, a common neighbors similarity measurement may be calculated between two clusters (i.e., each cluster being a merged set of at least two corpora) to determine if these two clusters should be merged into a new, larger cluster. The common neighbors similarity measurement is calculated until, eventually, the clusters are merged into one root cluster (i.e., root node). See bottom-up clustering approach discussed herein.

The analysis module 140*b* is configured to analyze a cluster of conceptually-related portions of text to develop a model. The analysis module 140*b* executes a portion of method 200 (see FIG. 2) to analyze the cluster of conceptually-related portions of text to develop the model. Further descriptions of analyzing a cluster of conceptually-related portions of text to develop a model are discussed in the exemplary method section. After the analysis module 140*b* has completed operation of analyzing a cluster of conceptually-related portions of text to develop a model, the model is used in the novelty module 140*c*.

The novelty module 140*c* is configured to calculate a novelty measurement between a first identified conceptually-related portion of text and the model. The novelty module 140*c* executes a portion of method 200 (see FIG. 2) to calculate a novelty measurement between a first identified conceptually-related portion of text and the model. Further descriptions of calculating a novelty measurement between a first identified conceptually-related portion of text and the model are discussed in the exemplary method section. After the novelty module 140*c* has completed the operation of calculating a novelty measurement, the novelty measurement is associated with a score and the score is used in the transmission module 140*d*.

The transmission module 140*d* is configured to transmit a second identified conceptually-related portion of text and a score associated with the novelty measurement. The transmission of a signal, via a wireless or wireline transmission channel 150, which includes a second identified conceptually-related portion of text and a score associated with the novelty measurement, occurs from server 120 to access device 130. In some embodiments, the first identified conceptually-related portion of text and the second identified conceptually-related portion of text are identical. Further explanation on these exemplary embodiments is described herein.

Exemplary Method as Conducted by System 100

Figure 2:
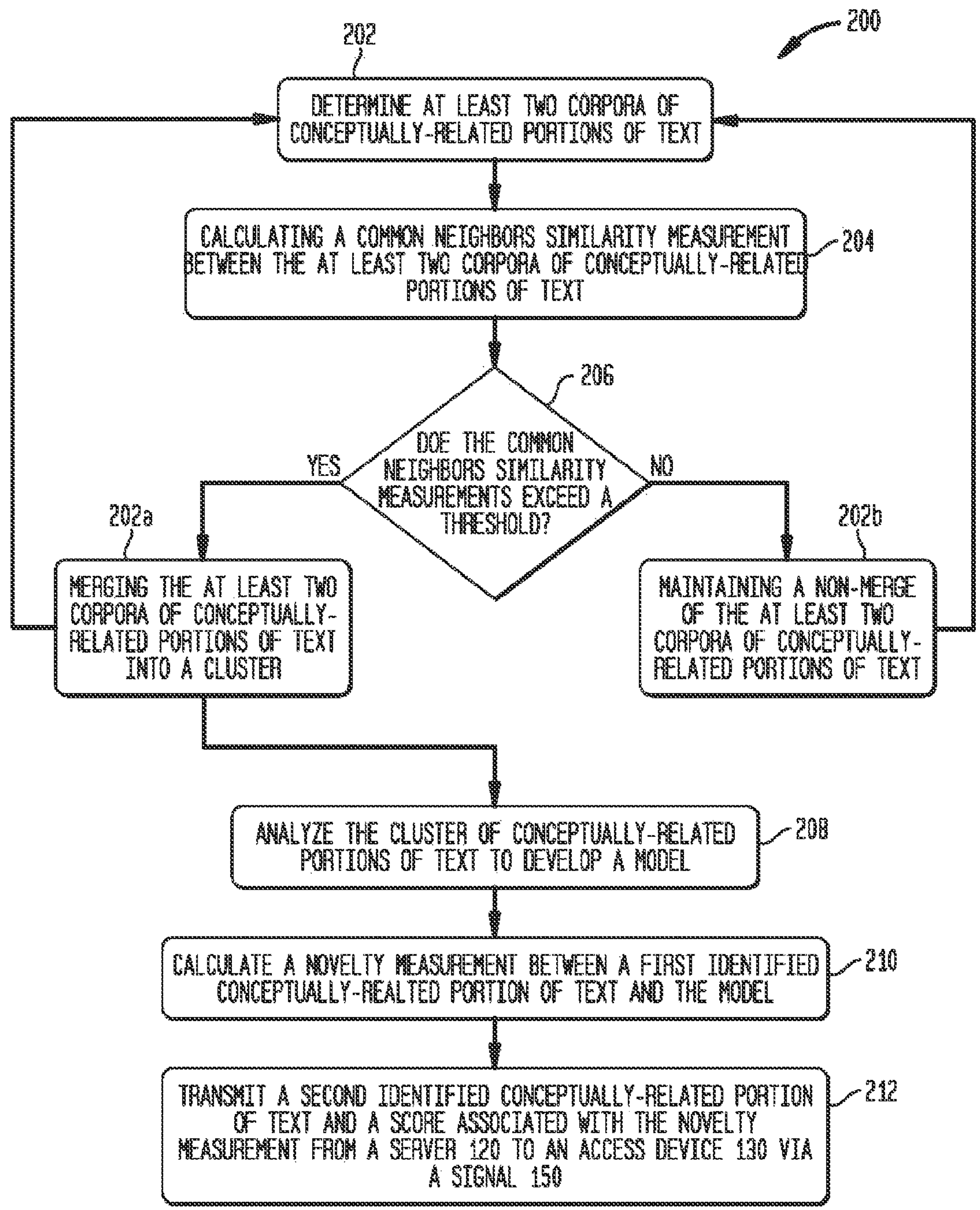
FIG. 2 is an exemplary method 200 which corresponds to one or more embodiments of the disclosure.

Referring now to FIG. 2, system 100 is configured to implement method 200. Method 200 includes functional blocks 202-212 and sub-blocks 206 *a-b*. These functional blocks are steps that perform actions including assignments, decisions, assessments and other like functions. Additionally, in exemplary method 200, documents and document clauses, such as contract, contract clauses and/or the plurality of each are consistent examples of conceptually-related portion(s) of text.

Prior to method 200 commencing, the content database 124 contains all the documents that may be potentially clustered. Before the clustering begins, all the documents are grouped by title, such as by contract title. An exemplary method of grouping by contract title includes 1) removing stop words (e.g., "a," "the," or "with") and entities within a contract title; 2) stemming the remaining words in the contract title; and 3) sorting alphabetically the stemmed versions of the remaining contract title words. The process of stemming uses linguistic analysis to get to the root form of a word. For example, if the user enters "viewer" as the query, the process of stemming reduces the word to its root (i.e., "view"). Stemming techniques are known to those skilled in the art. After the sorting has occurred, a natural grouping of contract titles emerges. For example, Contract Title A states "Microsoft Lease Agreement" and Contract Title B states "Agreement for Leases." Applying the three step grouping approach above leaves a stemmed, sorted version of Contract Title A "Agree Lease" and a stemmed, sorted version of Contract Title B "Agree Lease." Therefore, a natural grouping of Contract A and Contract B emerges.

Once the documents are grouped by title, in some embodiments, a static or dynamic grouping threshold is utilized to determine which groupings (i.e., each grouping is a corpus) are used for the calculation of the common neighbors similarity measurement. For example, a static grouping threshold implements a rule that all corpora containing 20 contracts or less are not eligible for the common neighbors similarity measurement. In another example, a dynamic grouping threshold is calculated by estimating cumulated distribution of the corpus size probability of all contracts and determining that only 80% of the corpora need to be clustered using the common neighbors similarity measurement. Cumulated distribution is well known to those skilled in the art. Either way, in some embodiments, only certain corpora are clustered using a common neighbors similarity measurement. The contracts contained in the corpora not clustered using the common neighbors similarity measurement are considered orphans and are processed later in method 200. For example, corpus A contains 15 contracts and corpus B contains 150 contracts. Using the static grouping threshold, corpus A would not be clustered using the common neighbors similarity measurement whereas corpus B would be clustered the using common neighbors similarity measurement. Furthermore, the contracts contained in corpus A are considered orphans and are processed later in method 200. In other embodiments, all the corpora are clustered using the common neighbors similarity measurement regardless of the static and, or dynamic grouping threshold.

In step 202, a determination of at least two corpora of documents, such as two corpora of contracts occurs. For example, two corpora could be "agree lease" and "agree employ" after the grouping approach is completed as described above. Once at least two corpora of contracts are determined, the process moves to step 204.

Figure 14:
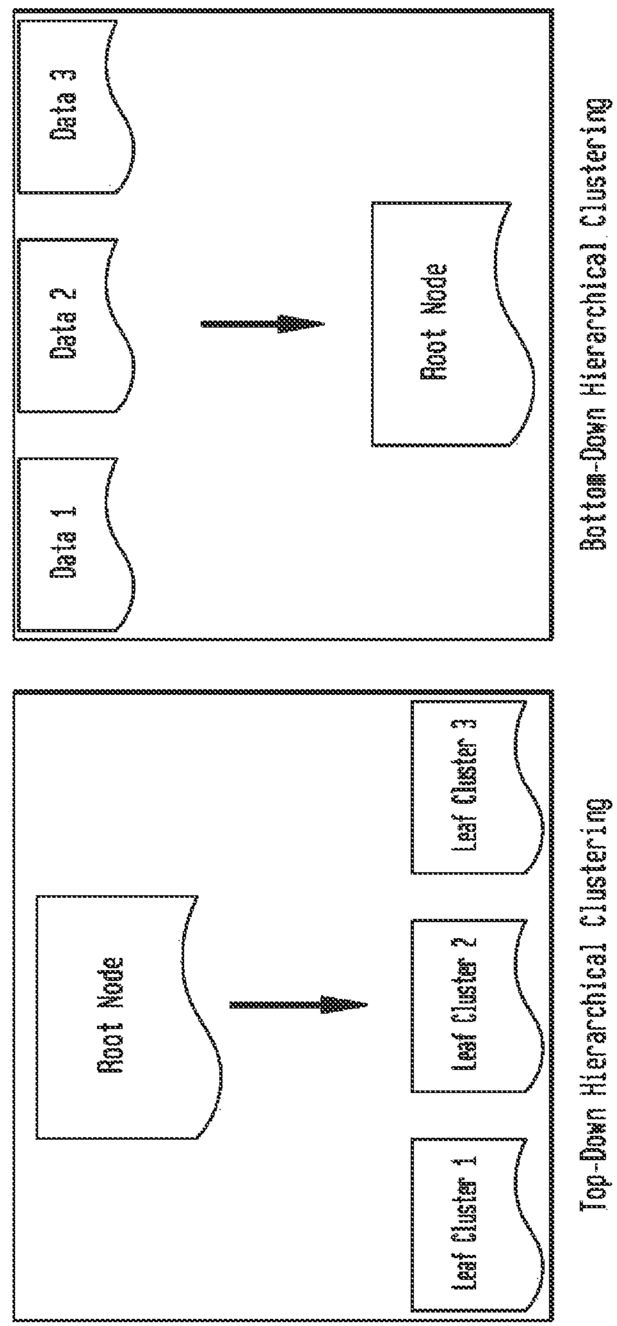
FIG. 14 is an exemplary method of agglomerative clustering which corresponds to one or more embodiments of the disclosure.

In step 204, a common neighbors similarity measurement is calculated between the at least two corpora of documents. The common neighbors similarity measurement utilizes hierarchical clustering, in particular, agglomerative clustering. There are two common hierarchical clustering approaches: top-down or bottom-up. See, FIG. 14. In the top-down approach, clustering starts with one root cluster (i.e., root node) and recursively splits every cluster until all leaf clusters (i.e., child nodes) are reached. In the bottom-up or agglomerative clustering approach, clustering starts with a piece of individual data (e.g., corpora) and merges similar pieces of individual data (e.g., multiple corpora) to create a cluster. Furthermore, the merging of similar clusters continues until only one cluster (i.e., a root node) is left.

In order to calculate the common neighbor similarity measurement, first, a centroid C is determined for each corpus. The centroid for each corpus is a representative document vector where C is a (qxm) matrix (q is the number of documents and m is the number of terms (words) in a dictionary). Next, a centroid to centroid similarity matrix is calculated by estimating Cosine distance of every pair of centroids:

$$D_{ij} = \frac{C_i * C_j}{|C_i||C_j|} \tag{1}$$

where $D_{ij}$ quantifies the strength of the similarity of the centroid pairing of two corpora i and j. A centroid to centroid similarity matrix is calculated for each corpus pairing. Next, the centroid to centroid similarity matrix D for each corpus pairing is transformed to an adjacency matrix A for each corpus pairing using the following formula:

$$A_{ij} = \begin{cases} 1, & D_{ij} \geq \tau \\ 0, & D_{ij} < \tau \end{cases} \tag{2}$$

where T is the threshold. Then each adjacency matrix A for each corpora pairing is populated into a cumulative adjacency matrix A. Finally, a common neighbors similarity matrix S is calculated by multiplying the cumulative adjacency matrix A by the transposed cumulative adjacency matrix A:

$$S = A \times A^{\tau} \tag{3}$$

The common neighbors similarity matrix contains all of the common neighbor similarity measurements for each corpus pairing. After the calculating the common neighbors similarity matrix and thus all of the common neighbor similarity measurements for each corpus pairing, the process proceeds to step 206.

In step 206, a decision action determines if the common neighbors similarity measurement exceeds the threshold. If the common neighbors similarity measurement does not exceed the threshold, the at least two corpora of documents maintain a non-merge of the at least two corpora of documents 206*b*. Put another way, the two corpora of documents are not merged and remain individual corpora. On the other hand, if the common neighbors similarity measurement exceeds a threshold, the at least two corpora of documents are merged into a cluster of documents 206*a*. For example, a contract corpus merges with another contract corpus based on the common neighbor similarity measurement into a merged set of corpora (i.e., a cluster). Other contract corpora maintain as individual corpora and not merge. In some embodiments, once a common neighbor similarity measurement is calculated and the two corpora are merged into a cluster, a centroid for the two merged corpora is re-calculated because a merged set of corpora (i.e., a cluster) now exists. Estimating cluster centroids requires performing summation over all the documents in a cluster for every single cluster. In a cluster with n documents and m words, estimating a cluster centroid is independent of the number of clusters.

For example, let aiG, k) be the kth word of/h document in cluster i. The cluster centroid C, is calculated as follows:

$$A_i(k) = \sum_{j=1}^{n_i} a_i(j, k), k \tag{4}$$

$$= \{k \mid k \in n, k \le m\}$$

$$C_i(k) = \frac{A_i(k)}{n_i} \tag{5}$$

where m is the number of words, and ni is the size of cluster i. Furthermore, suppose q clusters are to be merged. The estimated centroid of the new cluster after merging without performing summation on all documents in the cluster is as follows:

$$C_e(k)=\Sigma_{i=1}^{q}C_i(k) \tag{6}$$

However, the actual centroid of the new cluster is calculated by performing summation on all documents in the cluster.

$$C(k) = \frac{\sum_{i=1}^{n_i} A_i(k)}{\sum_{i=1}^{q} n_i} \tag{7}$$

In each merging, the centroids of collaborating clusters are reused and the estimated centroid is adjusted by Δ

$$C(k) = C_e(k) + \Delta(k) \tag{8}$$

$$\Delta(k) = \frac{-\sum_{i=1}^{q} \left\{ \sum_{j=1}^{q} n_j \prod_{j=1}^{q} n_j A(k)_i \right\}}{\sum_{i=1}^{q} n_i \prod_{i=1}^{q} n_i} \tag{9}$$

where $i \neq j$

Reusing the estimated centroid and adjusting by .DELTA. in each merging has an advantage over the direct calculation method by improving the performance time. Referring back to FIG. 2, steps 206, 206*a* and/or 206*b* continue until all corpus and/or cluster pairings have a decision action outcome. After the decision actions are made, a document taxonomy, such as a contract taxonomy 260 (see FIG. 2A) emerges.

Figure 2A:
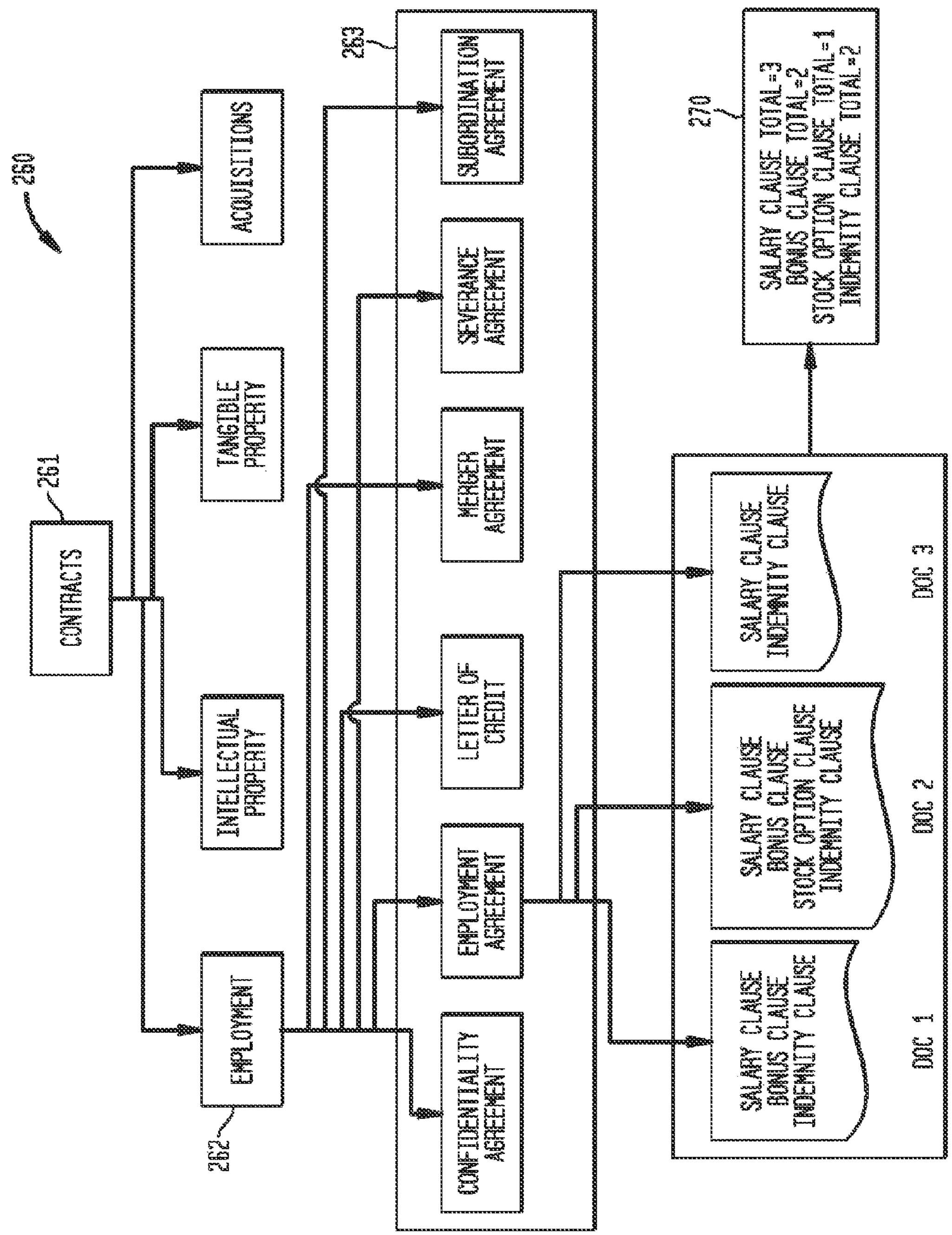
FIG. 2A is an exemplary contract taxonomy 260 which corresponds to one or more embodiments of the disclosure.

FIG. 2A includes an exemplary contract taxonomy 260. In some embodiments, only a partial view of the contract taxonomy is displayed to the user on access device 130 (see FIG. 4 for an exemplary user interface for displaying a set of clusters 263 to the user.) For example, contract taxonomy 260 includes a set of contract clusters 263. Within the set of contract clusters 263 resides, for instance, employment agreement cluster 265. Each contract cluster, within the set of clusters 263, is also called a leaf node because the contract cluster contains the contract documents associated with that cluster. For example, the employment agreement cluster 265 is a leaf node because it contains contract documents Doc1, Doc2 and Doc3. An internal node is at least a parent node or higher in the taxonomy structure. For example, in FIG. 2A, the set of contract clusters 263 is also an example of a set of leaf nodes and the nodes higher in the contract taxonomy 260 (e.g. Employment node 262 and Contracts node 261) are examples of internal nodes. The Contracts node 261 is an internal node as well as the root node for the contract taxonomy 260.

A leaf node is labeled by using the most frequent contract document title from within the contract documents in the leaf node. An internal node is labeled by using the most frequent un-stemmed word or words within the all the contract documents the internal node includes. For example, the Employment node 262 is an internal node. Employment node 262 has a parental relationship to the set of contract clusters 263 which contain the contract documents (e.g., Doc1, Doc2, Doc3, etc.). The label "Employment" for the Employment node 262 occurred because the top stemmed word was "employ." Once the top stemmed word was determined, another listing is consulted to determine the most frequent un-stemmed version of "employ" within the contract documents of the employment node 262. In this instance, the most frequent un-stemmed version of "employ" is "employment." Thus the label for the Employment node 262.

Once the contract taxonomy 260 has been initially created via the steps 202-206, some embodiments further populate the contract taxonomy 260 by placing the orphans within the taxonomy. Orphans did not meet the static or dynamic grouping threshold. In order to place those orphaned contracts into the contract taxonomy 260, one skilled in the art may use a classifier to determine the "best fit" into the contract taxonomy 260 or may have a manual process of determining where in the contract taxonomy 260 the orphans should be placed. In one embodiment, the classifier may use systems, methods described in the following U.S. patents: U.S. Pat. No. 7,062,498 and U.S. Pat. No. 7,580,939. Each U.S. patent is herein incorporated by reference.

Contract clauses are clustered in an almost identical fashion to the contracts, the significant difference being the defined set of conceptually-related portions of text being clustered. For contracts, all the contracts were considered when applying the static or dynamic grouping threshold. Whereas for contract clauses, only the contract clauses within an individual contract cluster are considered when applying the static or dynamic grouping threshold. Furthermore, the contract clause clustering process occurs as many times as there are contract clusters. Referring back to FIG. 2A, there are a set of contract clusters 263. The set of contract clusters 263 contains six individual contract clusters. Therefore, the contract clause clustering process occurs six times before completion. In addition, the contract clause clustering process only clusters the clauses within an individual contract cluster. For example, employment agreement cluster 265 contains contracts Doc1, Doc2 and Doc3. Only the contract clauses within those contracts are clustered. This enables the contract clause clusters to directly relate to the contract cluster and thus the contract taxonomy 260. For example, once the contract clause clustering is complete on employment agreement cluster 265, a listing of the contract clause clusters 270 is created and a signal containing the listing of contract clause clusters 270 is transmitted, via the wireless or wireline transmission channel 150, and ultimately displayed to the user on access device 130 (see FIG. 4 for an exemplary user interface illustrating a listing of contract clause clusters 270). Referring back to FIG. 2, after a contract taxonomy, such as the contract taxonomy 260, including the set of contract clusters 263 and contract clause clusters 270, is populated, the process advances to step 208.

In step 208, a cluster of either documents or document clauses is received and analyzed by analysis module 140*b* to develop a model. A separate, independent model is created for each document cluster and for each document clause cluster. Developing an exemplary contract clause model and an exemplary contract model are each described herein using steps 208-212.

Steps 208-212 for Exemplary Contract Clauses

In step 208 for contract clauses, prior to developing an exemplary contract clause model, a dictionary is created of all the words within all the contracts. Some embodiments may remove stop words from the dictionary for processing optimization. Other embodiments include only having a stemmed version of the word included in the dictionary. After the dictionary is created, the probability of each word's occurrence in a sentence within a contract clause cluster is calculated. Referring back to FIG. 2A, the contract taxonomy 260 includes a listing of the contract clause clusters 270, wherein an exemplary contract clause cluster is Salary Clause. Since the sentence probability only counts sentences, one occurrence of a word in a single sentence is recorded regardless of how many times the word actually occurs within that single sentence. Therefore, if a word is used twice in a sentence, the word only occurs once for purposes of deciding if the word occurs in the sentence. The sentence probability is calculated by:

$$\frac{\left(\begin{array}{c}\text{Total number of Sentences Word } X\\ \text{Occurs in Each Contract Clause Cluster}\end{array}\right)}{\left(\begin{array}{c}\text{Total Number of Sentences}\\ \text{in Each Clause Cluster}\end{array}\right)} \tag{10}$$

For instance, if the word "severance" occurs in 30 sentences within contract clause cluster "Salary Clause" and there are 1,000 sentences within the contract clause cluster "Salary Clause," then the sentence probability that the word "severance" occurs in a sentence within the contract clause cluster "Salary Clause" is (30)/(1,000)=0.03. In some embodiments, the probabilities of words in sentences are actually smoothed. Smoothing means that even if a word never occurs within a sentence of a clause of a particular clause cluster, the probability of that word is not 0. Several smoothing techniques are known to those skilled in the art. After all the sentence probabilities of each word are calculated, a model is developed by having a word and corresponding sentence probability matrix. For example, contract clause cluster A has the following model:

| Word | (#of Sentences Word X Occurs Within Contract Clause Cluster A)/(Total # of Sentences Within Contract Clause Cluster |
|---|---|
| A Severance | (300)/(3,000,000) = 0.001 |
| Salary | (0)/(3,000,000) = 0 |
| Negotiate | (1,000,000)/(3,000,000) = 0.3333 |

This exemplary model shows the word "salary" does not occur in a sentence within contract clause cluster A. Therefore "salary" would not be a word to use for a contract clause cluster A model. However, the word "negotiate" has a probability of 0.3333. Thus, compared to all the other probabilities listed, "negotiate" has the highest probability of being used in a contract clause cluster A model. After each contract clause cluster is analyzed and a model is developed, the process continues to step 210.

In step 210 for contract clauses, a novelty measurement is calculated between an identified sentence and the contract clause cluster model. First, a model probability is calculated by $$\frac{\left(\begin{array}{c}\text{Total Number of Word } X\\ \text{Occurences in Sentence } Y\end{array}\right)}{(\text{Total Number of Words in Sentence } Y)} \tag{11}$$

If there is no word X occurrence in sentence Y then the total number of word X occurrences in sentence Y is 0. In some embodiments where a word occurrence happens only once per sentence, the total number of word X occurrences in sentence Y is 1. Continuing this example, if the total number of word X occurrences in sentence Y is 1 and the total number of words in sentence Y is 5 then the sentence probability is (1)/(5)=0.2. Second, the two sets of probabilities, the model probability and each sentence probability, are compared to each other using the Kullback-Leibler (KL) divergence method. See http://en.wikipedia.org/wiki/Kullback%E2%80%93Leibler_divergence. While this exemplary embodiment uses the KL divergence method, one skilled in the art would appreciate and utilize other equivalent divergence methods. Once the KL divergence values are calculated, a mean and standard deviation are calculated based on the KL divergence values for the contract clause cluster. The standard deviation is a calculation between the mean contract clause KL and the contract clause KL. Then, a normalized KL divergence value is calculated by:

$$\frac{\left(\begin{array}{c}\text{Contract Clause } KL -\\ \text{Mean Contract Clause } KL\end{array}\right)}{(\text{Standard Deviation})} \tag{12}$$

The normalized KL divergence value is then passed on to the normal cumulative distribution function in order to receive the probability of the corresponding sentence being in the contract clause cluster model. Normal cumulative distribution function is well known to those skilled in the art. For example, there is a KL divergence value of 5 between contract clause cluster A model and sentence Y. After the mean and standard deviation are calculated, a normalized KL divergence value is calculated to be 4.5. The normalized KL divergence value is then passed on to the normal cumulative distribution function in order to receive the probability of the sentence Y being in the contract clause cluster A model. The probability of the sentence Y being in the contract clause cluster A model is an example of a novelty measurement between sentence Y and the contract clause cluster A model. In some exemplary embodiments, the novelty measurement is associated with a conformity measurement (!-novelty measurement). For example, if the novelty measurement is 0.03 then the conformity measurement is 0.97. Continuing from the current example, all the conformity measurements from each sentence within an individual contract clause are aggregated and averaged to determine a score for the individual contract clause. In other embodiments, all the novelty measurements from each sentence within an individual contract clause are aggregated and averaged to determine a score for the individual contract clause. Some exemplary scores directly use the novelty measurement, for example, if the novelty measurement is 0.3 then an exemplary score might be 3 (0.3 multiplied by 10 for score above 0). Other exemplary scores indirectly use the novelty measurement by calculating the conformity measurement from the novelty measurement, for example, if the novelty measurement is 0.3 then an exemplary score might be 7 (1-0.3 multiplied by 10 for score above 0). Either way, after each novelty or conformity measurement and its corresponding score are calculated, the process executes step 212.

In step 212 for contract clauses, an identified contract clause and a score associated with a novelty measurement are transmitted from a server 120 to an access device 130 through a signal via a wireless or wireline transmission channel 150. The score being transmitted is the score for the identified contract clause. For example, FIG. 6 includes two examples of contract clauses and corresponding scores. In this particular embodiment, conformity measurements are calculated, averaged and multiplied by 10 so the range of conformity scores is 0 to 10.

In some exemplary embodiments, in step 210 for contract clauses, instead of having an identified sentence, an identified contract clause is used. Steps 210-212 for contract clauses stay essentially the same except for following two adjustments. First, instead of a sentence probability, a contract clause probability is calculated by:

$$\frac{\left(\begin{array}{c}\text{Total Number of Word } X\\ \text{Occurences in Contract Clause } Y\end{array}\right)}{(\text{Total Number of Words in Contract Clause } Y)} \tag{13}$$

Second, unlike the sentence novelty measurements being aggregated and averaged, once the normal cumulative distribution function probability is determined, the contract clause probability is the contract clause novelty measurement. Therefore aggregating and averaging of novelty measurements is not necessary.

Steps 208-212 for Exemplary Contracts

In step 208 for contracts, the probability of a contract clause existing within a contract is calculated by:

$$\frac{\left(\begin{array}{c}\text{Total Number of Occurences of}\\ \text{Contract Clause Within a Contract Cluster}\end{array}\right)}{\left(\begin{array}{c}\text{Total Number of Contracts}\\ \text{Within a Contract Cluster}\end{array}\right)} \tag{14}$$

After all the contract clause probabilities are calculated, a contract cluster model is developed by having a clause and corresponding clause probability matrix. For example, contract cluster A has the following model:

| Clause | (Total Number of Occurrences of Contract Clause Within a Contract Cluster)/(Total Number of Contracts Within a Contract Cluster |
|---|---|
| A) Bonus Clause | (3,000)/(3,000,000) = 0.001 |
| Salary Clause | (0)/(3,000,000) = 0 |

This exemplary model shows the contract clause "Salary Clause" does not occur within contract cluster A. Therefore, "Salary Clause" would not be a clause to use for a contract cluster A model. However, the word "Bonus Clause" has a probability of 0.001. Thus, compared to all the other probabilities listed, "Bonus Clause" has the highest probability of being used in a contract cluster A model. After each contract cluster is analyzed and a model is developed, the process continues to step 210.

In step 210 for contracts, the novelty measurement calculation starts with calculating a contract clause value. A contract clause value multiplies (Probability of a Contract Clause Existing within a Given Contract (see Step 208 for contracts)) by (Individual Contract Clause Novelty Measurement). A contract clause value is calculated for each contract clause with a given contract. Then all the contract clause values for the given contract are summed to calculate the un-normalized contract novelty measurement. Once the un-normalized contract novelty measurements are calculated for each contract, a mean and standard deviation are calculated based on the un-normalized contract novelty measurement for the contract. Then, a normalized contract novelty measurement is calculated by:

$$\frac{\left(\begin{array}{c}\textit{UnNormalized}\text{ Contract Novelty Measurement} -\\ \text{Mean Contract Novelty Measurement}\end{array}\right)}{(\text{Standard Deviation})} \tag{15}$$

The normalized contract novelty measurement is then passed on to the normal cumulative distribution function in order to obtain the probability of the corresponding contract being in the contract cluster model.

In step 212 for contracts, an identified contract and a score associated with the novelty measurement are transmitted from a server 120 to an access device 130 through a signal via a wireless or wireline transmission channel 150. The score being transmitted is the score for the identified contract. For example, FIG. 6 includes an example of contract and its corresponding score. In this particular embodiment, conformity measurements are calculated and multiplied by 10 so the range of conformity scores is 0 to 10.

In some exemplary embodiments, in step 210 for contracts, instead of having an identified contract clause, an identified contract is used. Steps 210-212 for contracts stay essentially the same except for two adjustments. First, instead of a contract clause probability, the contract probability is calculated by:

$$\frac{\left(\begin{array}{c}\text{Total Number of Occurences of Word } X\\ \text{Within a Contract Cluster}\end{array}\right)}{\left(\begin{array}{c}\text{Total Number of Words}\\ \text{Within a Contract Cluster}\end{array}\right)} \tag{16}$$

Second, once the contract probability is calculated, a KL divergence value and a normalized KL divergence value are calculated similar to the steps for contract clauses described above. Next, the normalized KL divergence value is passed to a normal cumulative distribution function to determine a contract novelty measurement. Therefore, aggregating and averaging of novelty measurements is not necessary.

Exemplary Interfaces

FIGS. 3-6 show exemplary interfaces 300-600, respectively, for system 100 and method 200, which may be adapted to incorporate the capabilities, functions, systems and methods of the present disclosure.

Figure 3:
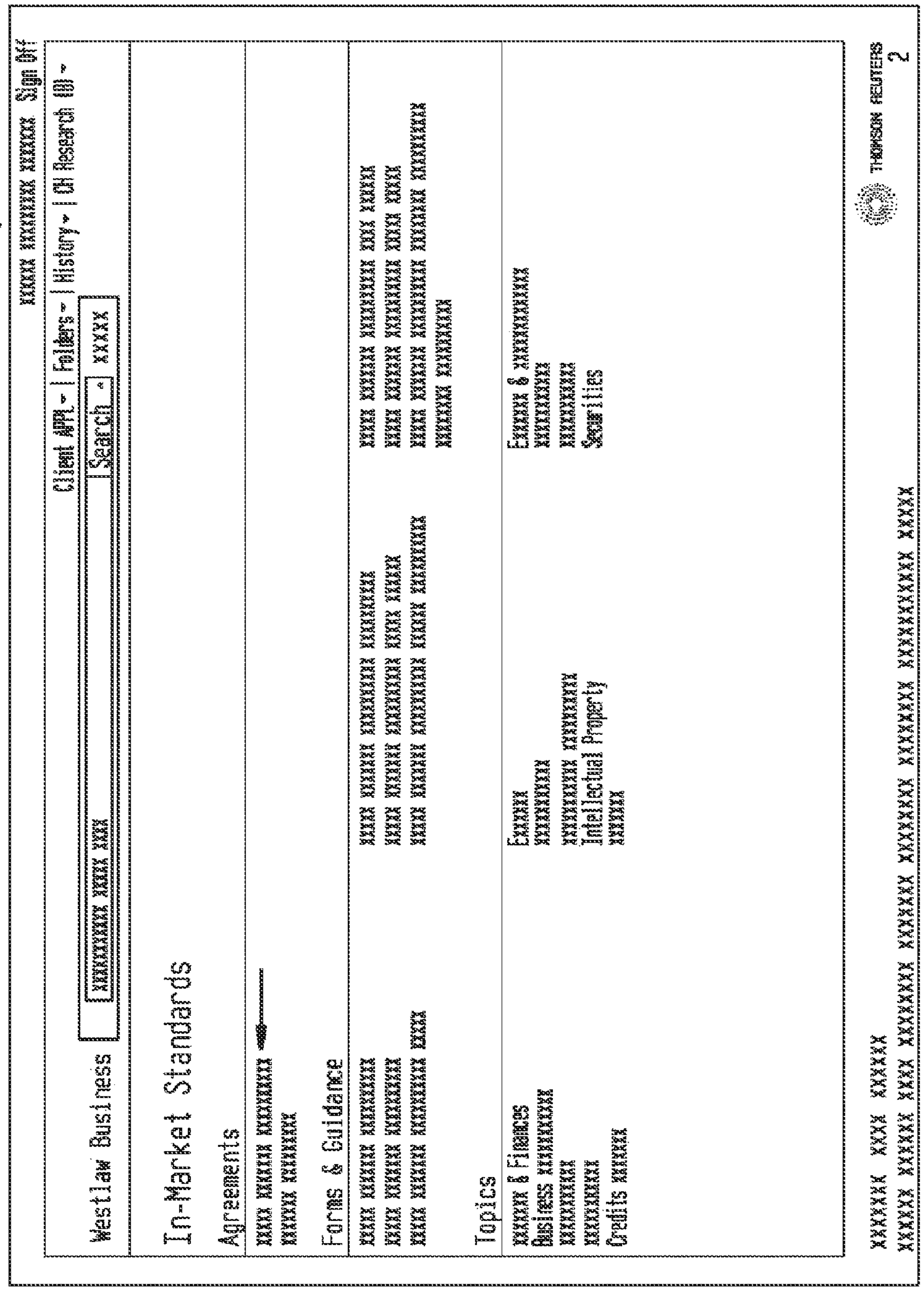
FIG. 3 is an exemplary interface 300 which corresponds to one or more embodiments of the disclosure.
Figure 4:
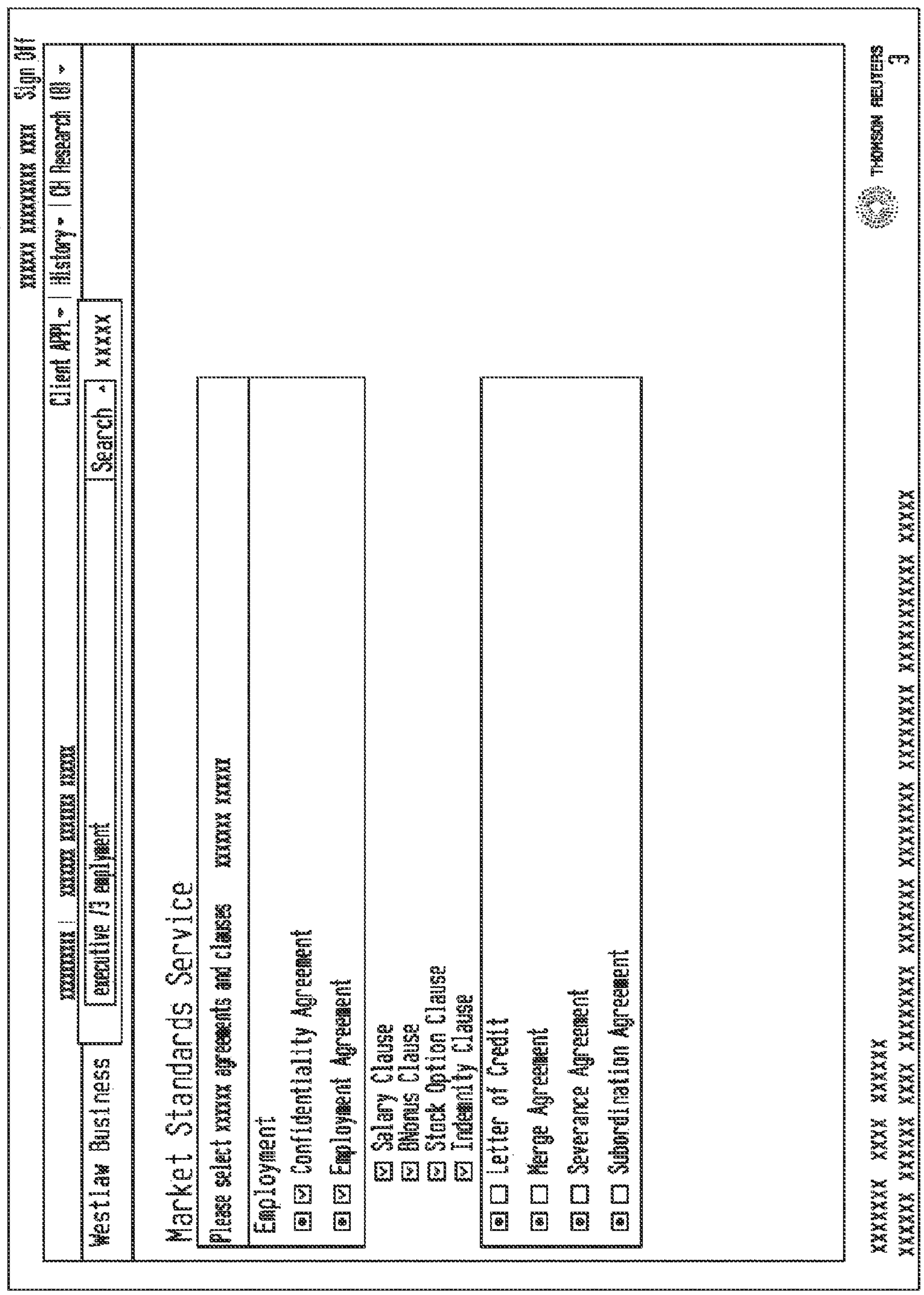
FIG. 4 is an exemplary interface 400 which corresponds to one or more embodiments of the disclosure.

FIG. 3 illustrates an exemplary interface 300 of display 1381 on an access device 130, for example, a laptop. The display 1381 depicts an access point for a user to initiate system 100, via method 200. The user selects the hyperlink "Markets Standard Service." The selection navigates the user to a table of contents (i.e., a contract taxonomy 260 or a portion of the contract taxonomy 260) for all contracts located within the content database 124. FIG. 4 illustrates an exemplary interface 400 of part of a contract taxonomy 260 along with a contract clause listing 270. A user may then search this partial contract taxonomy by 1) clicking the hyperlink of any one contract or contract clause cluster to retrieve all of the contracts or contract clauses of that contract type from the content database 124 or 2) checking a box next to one or more of the contract and/or contract clause clusters along with entering a query (i.e. search terms) at the top of the display 1381. For example, in FIG. 4 the user has selected Confidentiality Agreement contract cluster, Employment Agreement contract cluster, Salary Clause contract clause cluster, Bonus Clause contract clause cluster. Stock Option Clause contract clause cluster, Indemnity Clause contract clause cluster along with entering a query of "executive/3 employment." This selection gathers all the contracts and contract clauses from the selected contract clusters and contract clause clusters and retrieves only the contracts and contract clauses that have the relevant search terms.

Figure 5:
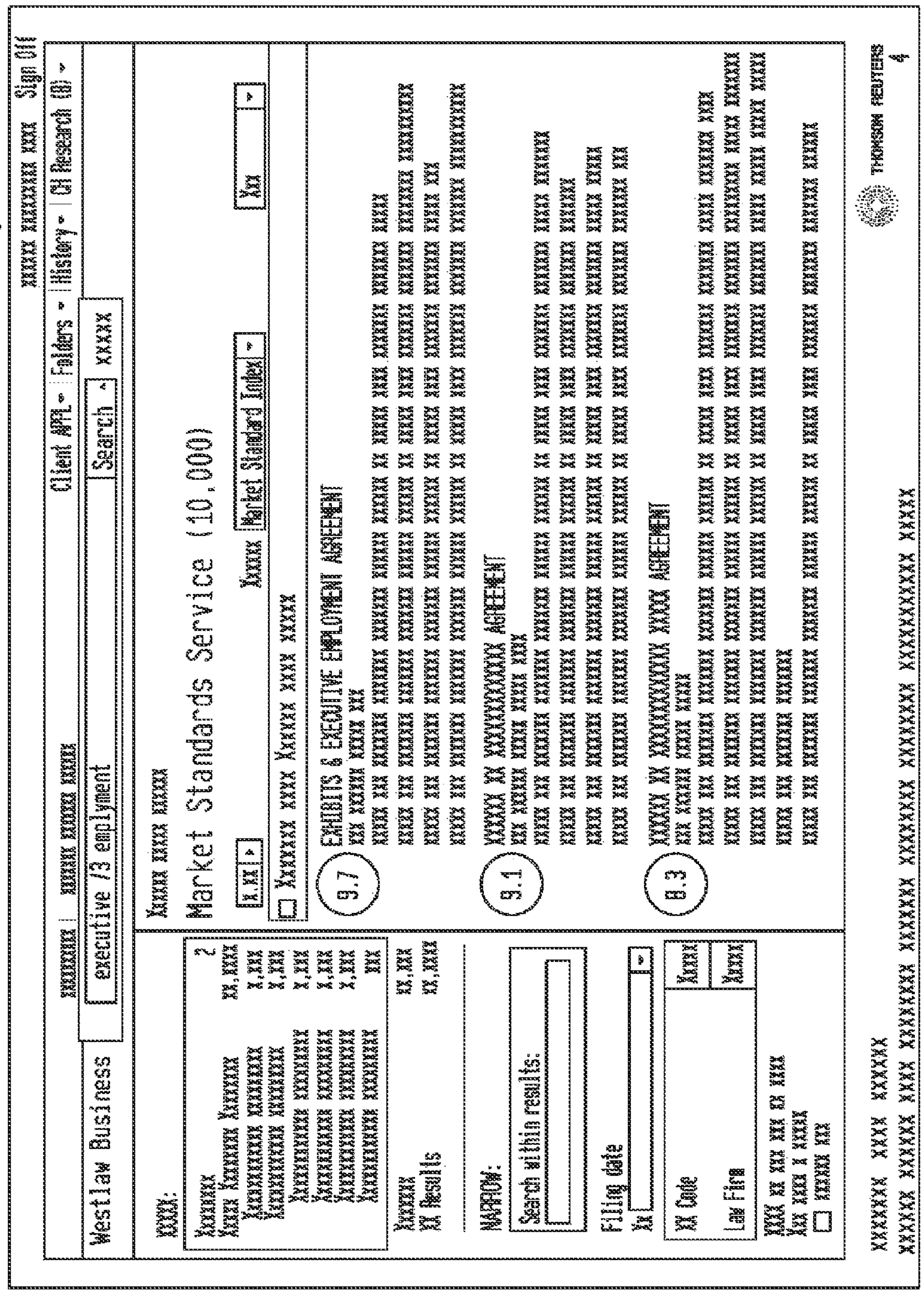
FIG. 5 is an exemplary interface 500 which corresponds to one or more embodiments of the disclosure.

FIG. 5 is an exemplary interface 500 displaying the results of the example query mentioned in FIG. 4. These results are transmitted from a server 120 to the access device 130 through a signal via a wireless or wireline transmission channel 150 and the results include a second identified conceptually-related portion of text (e.g., contract clause and/or contract) and a score associated with novelty measurement of the first identified conceptually-related portion of text (e.g., a sentence and/or a contract clause). For instance, in FIG. 5, three contracts from the selected contract clusters are displayed to the user as having the required search terms. In addition, a score is populated next to each contract notifying the user of the conformity of the contract to the contract cluster model.

FIG. 6 shows an exemplary interface 600 of display 1381 which depicts another access point for a user to utilize system 100, via method 200. While viewing a contract within system 100, the user may click on a score provided next to the contract title or the contract clause title. The score is associated to a contract or contract clause which in turn is associated to its contract cluster or contract clause cluster. By clicking on a score, the search module 123 initiates a search within content database 124 to retrieve all the contracts or contract clauses that are part of the selected contract cluster or contract clause cluster. Once retrieved, the results of all the contracts or contract clauses that are part of the selected contract cluster or contract clause cluster are displayed to the user. This access point benefits the user to see other, comparable contract or contract clauses to the contract or contract clause that is currently being viewed.

Other exemplary embodiments include processes for adding new conceptually-related portions of text (e.g., contracts and/or contract clauses) into system 100, via method 200. For example, one process receives of the first identified conceptually-related portion of text (e.g., a contract) to come from a third party such as an attorney and/or law firm. The contract, for instance, is uploaded to the processing program 140 and method 200 is executed. Another example includes a process of uploading a new contract and manually editing the contract taxonomy 260 to add another contract cluster, instead of executing method steps 202-208, because the new contract does not logically belong in an existing contract cluster. The same logic applies to contract clauses and/or any other conceptually-related portions of text. Yet another example includes a process for bypassing the method steps 202-208 and just classifying the new contract into the contract taxonomy 260. In addition, a score for the new contract and each corresponding contract clause are calculated, transmitted and ultimately displayed to the user. This example allows for faster processing and display times by not having to initiate steps 202-208. However, in this classifying example, the new contract is not used in developing the model because steps 202-208 are bypassed. Yet, due to the volume of contracts being analyzed, one new contract should not significantly affect the development of a contract model.

The embodiments described above and in the claims are intended only to illustrate and teach one or more ways of practicing or implementing the present disclosure, not to restrict its breadth or scope. For example, the processing program 140 may be executed prior to a user initiation (i.e., pre-processing) or the processing program 140 may be executed by a user initiated event (e.g. a user submits a draft contract to be analyzed "on the fly" against a contract corpus). In another example, FIG. 1 shows browser 1383 and display 1381 as having the ability to display simultaneously; however, in operation, some embodiments may present them at separate times. The actual scope of the disclosure, which embraces all ways of practicing or implementing the teachings of the disclosure, is defined by the claims and their equivalents.

Exemplary Analysis of Document Text in a Financial Document

Embodiments of the present disclosure further include a system and method that automates extraction of the unstructured information within a document, uses language models to create a conformity score that indicates the typicality (ranging from boilerplate to normal) or the lack of typicality in the text. Specifically, the information content of the type of language within the document, such as the MD&A and NTFS sections within a SEC filing, is investigated via creation of their language models. Using this model, a score for each section is generated that measures where the section lies on the distribution. This allows sections that have typical language to be distinguished from those with atypical language. Language models are also created according to sector and market cap, as well as temporally. For example, language that may be typical for one sector (or market cap level) might not be for another sector (or market cap) or the impact of year on year changes of a company's language model on the stock market return may aid identifying atypical language. The stock market returns for companies with primarily boilerplate, average, and outlier type of language are also computed. A variety of models is created to compare a company's language model across time, a company's model against other market cap and sector peers, a company's model with all other companies in the previous quarter. An investment hypothesis is then tested to determine whether investors penalize a company's stock when the firm tells an overly complex story, intentional or unintentional.

One approach to automatically determine which sentences have informative content, which are typical, and which are boilerplate, would be a dictionary based approach. Such an approach would require domain experts to rigorously define the terms or statements that would define an informative or boilerplate disclosure and search for those in the disclosed text. This system would not only require very rigorous rules encompassing a wide range of possibilities but would also not generalize well to previously unseen cases. It would have to be retrained frequently with additional rules to incorporate contemporaneous trends or counter any work-around that companies might come up with.

In contrast to such an approach would be a statistical approach that analyzes a broad set of filings and figures out trends, common language, correlations etc. Advantages of such a system include simplicity, good generalization to unseen cases, and the ease of extension to different peer sets. For example, it is characteristic of a company in the Energy sector to state customary warnings about oil prices. However it might be abnormal for a company in the Healthcare sector to do so. While a rule-based system would become extremely complicated in handling the numerous combinations, a statistical one can handle it in a fairly easy manner. The downside of using a statistical system is of course that it cannot beat human expertise on the training corpus.

A statistical language model is a distribution of word occurrences (usually probabilities) over a given space of words. It assigns a probability, P(w1, . . . , wm), to a sequence of m words by means of this probability distribution. The assigned probability is considered as the likelihood of generating the sequence of m words (presumably of a document d) from the given language model. The language model itself is constructed from a corpus of a reference set of documents. These documents are used to compute sequence occurrence probabilities.

The probability of a sequence of words can be written as the probability of each successive word conditioned on earlier words. For example, the 4-gram sequences can be written as:

$$p(w_1,w_2,w_3,w_4)=p(w_1)p(w_2|w_1)p(w_3|w_2,w_1)p(w_4|w_3,w_2,w_1). \quad (17)$$

N-gram models where N>1 are important for speech recognition, machine translation or spelling correction type of tasks where sequences and grammar are extremely important. In practice, unigram language models are most commonly used in information retrieval, as they are sufficient to determine the topic from a piece of text. Unigram models only calculate the probability of hitting an isolated word, without considering any influence from the words before or after the target. Hence, for a unigram model, the probability of seeing four words wP . . . , $w_4$ can be written as:

$$p(w_1,w_2,w_3,w_4)=p(w_1)p(w_2)p(w_3)p(w_4). \quad (18)$$

This leads to the Bag of words model that generates a multinomial distribution over words. The standard multinomial distribution is represented as:

$$P(d) = \frac{L_d!}{tf_{t_{1,d}}!tf_{t_{2,d}}!\ldots tf_{t_{M,d}}!} P(t_1)^{tf_{t_{1,d}}!} P(t_2)^{tf_{t_{2,d}}!} \ldots P(t_M)^{tf_{t_{M,d}}!} \quad (19)$$

where, $$L_d = \sum_{1 \le i \le M} tf_{t_{i,d}}$$

is the length of document d, M is the size of the term vocabulary, and the products are over the words in the vocabulary.

Estimating the probability of sequences can become difficult in corpora, in which phrases or sentences can be arbitrarily long and hence some sequences are not observed during training of the language model (data sparseness problem or over-fitting). For that reason these models are often approximated using smoothed N-gram models. In the present disclosure, the exemplary method is disclosed using a smoothed unigram models. However, any N-gram model may be used for language modeling.

Figure 13:
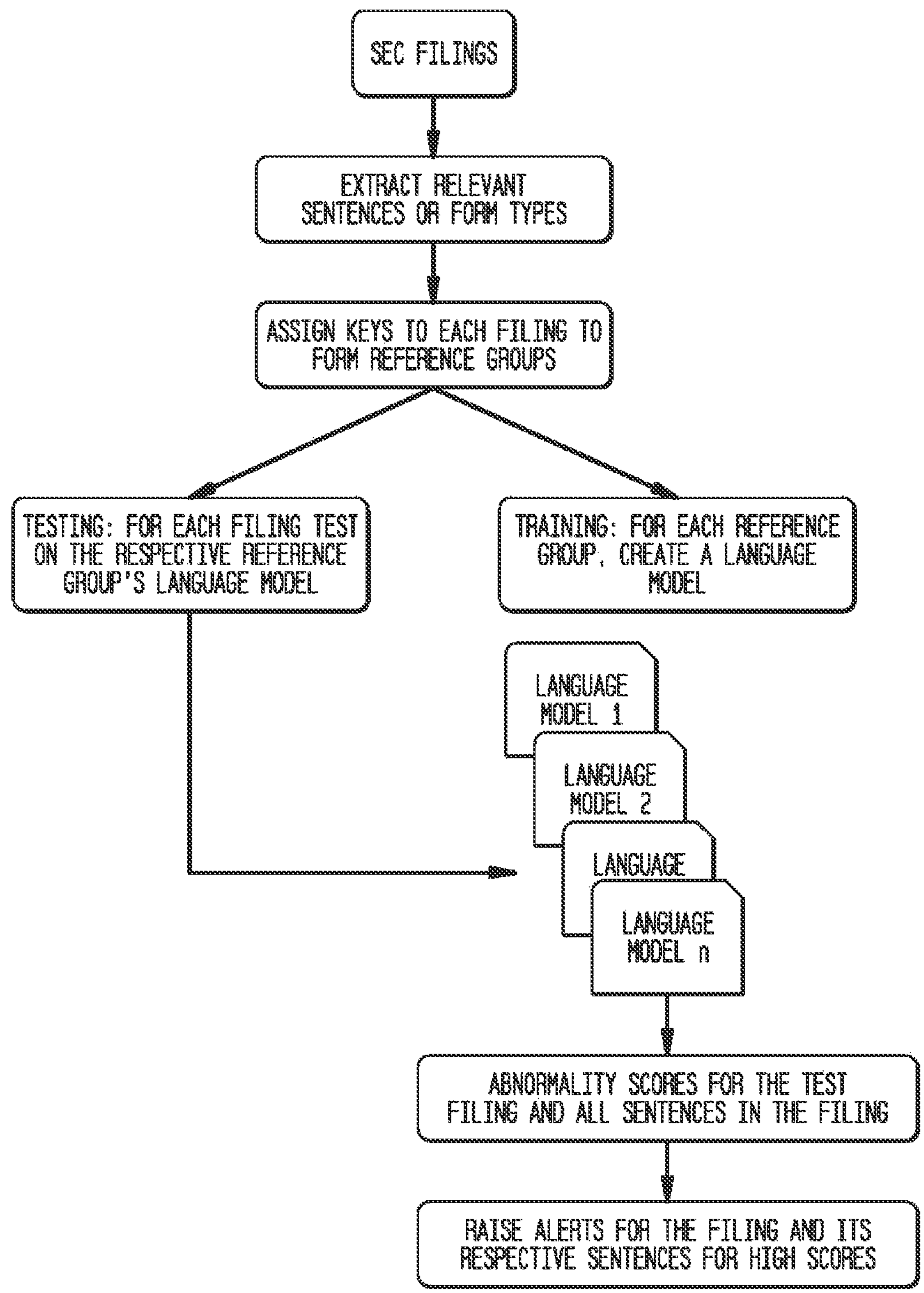
FIG. 13 is an exemplary method which corresponds to one or more embodiments of the disclosure.

An exemplary method as illustrated in FIG. 13, begins with obtaining a plurality of financial documents, such as SEC filings, which are obtained on a daily basis. For example, daily SEC filings are retrieved that are available as a nightly tar ball containing all the documents filed that day. Extraction of relevant sections in the financial document occurs, such as extraction of the MD&A and NTFS sections in a Form 10-K or Form 10-Q. In one embodiment, since the size of the entire filing corpus is massive, the compressed file is read on Hadoop using custom parsers. In another embodiment, to address the issue of different companies having non-consistent format of the filing, as well as the embedding of sections, additional functionality is implemented to incorporate most of the usual formats and used regular expressions to identify sections boundaries and extract sections of interest.

A key for each financial document is then created, in which each company's filing is assigned a set of keys based on certain groupings. According to one embodiment, three keys are used based on the peer groups that are to be compared against: (i) time period of the financial document, (ii) sector and (iii) market cap group of the company. A key for time period of the financial document is generated to be used both during the testing and training phases. For example, in the training period, if the filing was filed in the first quarter of 2011, a time key value of "2011Q1" is assigned. In the testing phase, the key is used to denote which model we want the filing to be compared against. For example, a filing in first quarter of 2011 can be compared against a time key value of "2010Q4" or "2010Q1." A key for the sector is also generated, in which filings are grouped in the in the twelve sectors: finance, health, consumer non-durables, consumer services, consumer durables, energy, transportation, technology, basic industries, capital goods, utility, and miscellaneous. A key for the market cap is also generated, in which the appropriate label of small, mid and large cap are assigned to each filing based on the market capitalization of filing company. These keys are then used to implicitly create reference set groupings for the documents. For example, all filings with key "large" are used to create one reference set group representing all large cap companies.

Sections of the financial documents are then tokenized and broken down into sentences using language model techniques known in the art, such as OpenNLP's sentence boundary recognizer. Sentences are then broken down further into tokens, such as into unigram tokens. Tokens are then stemmed using common stemming techniques known in the art, such as the Porter stemmer. This has the advantage that different lexical representations are reduced to their root form. For example "walking," "walk," and "walked" will all be converted to "walk." According to one embodiment, a standard stop words list is used to remove stop words and punctuation marks such as "a," "already," "nevertheless."

A distribution of the language models is then determined. According to one embodiment, the counts of tokens in each section is computed and normalized to obtain the corresponding probabilities of occurrence of tokens in each section. In one embodiment, the expected probability distribution of token occurrence is also computed in each reference group. According to one embodiment, we use an-gram model, such as a unigram language model, that generates a multinomial distribution of token probabilities. The obtained multinomial distribution Pr(wl, . . . , wm), across each reference set group r is considered its language model.

A score for individual sections per reference set are then generated in order to achieve the ultimate goal to distinguish between boilerplate language and outlier type of language. The respective reference groups that a section belongs to is determined and for each reference group's language model, the probability of seeing a particular document is generated using the corresponding multinomial distribution. The probability that a particular document, d, was obtained from the corresponding language model, can be obtained as:

$$p_r(wl, \ldots, wm) = \Pi_{k=1}{}^{m} \log(p(wk)) \quad (20)$$

where Wk represents the k-th word, m is the number of unique words in the document, $p(w_k)$ represents the probability of drawing token Wk from the respective reference group's language model. This can be used to assign a score to each sentence as well as each section. The underlying fundamental being that sentences with words not typically seen are marked as atypical sentences while those with very usual word distribution is considered boilerplate. These scores are then used to highlight sentences that have $(p_r)$ very low scores as boilerplate sentences. Sentences with the highest scores are also highlighted as "outlier" sentences. These sentences have topics not usually seen, and hence demand attention. The Kullback-Leibler divergence of each section's token distribution is also computed from the language model. The obtained value is passed to a cumulative distribution function to generate corresponding probability score. Accordingly, atypical sections as to those top scores are identified disclosure; are identified, and sections that lie between the two extremes are identified as normal.

In one example, the methodology is performed on a universe size of 36,527 stocks that is obtained by filtering on all US, Equity, Common Stock, trading on any of the major US electronic exchanges (NASDAQ, NYSE, ARCA, NYSE AMEX). Over-The-Counter ("OTC") exchange is not included, because it includes mostly low price stocks and its prices can have very high volatility. In the case of multiple issues by a company, only the issue with rank 1, the primary trading issue, is considered. Note that at one point in time, not all of these 36,527 stocks are active. This number is the total number of stocks that were ever active and met the filtering criteria. Table 3 gives the universe size with respect to each year. These numbers are obtained as the total number of stocks that have at least one valid daily price available in the year.

| Year | Number of Active Stocks |
|---|---|
| 2011 | 4567 |
| 2010 | 4773 |
| 2009 | 4803 |
| 2008 | 5017 |
| 2007 | 5372 |
| 2006 | 5446 |
| 2005 | 5483 |
| 2004 | 5574 |
| 2003 | 5595 |

A hypothesis of the present disclosure is that there is under-exploited information in the textual portions of a firm's regulatory picture. The degree to which a market is efficient determines how rapidly new information is absorbed and understood by market participants and therefore how quickly prices adjust to this new information by those participants' trading activity. Several consensus models of asset prices reviewed in order to measure the ability to predict returns different than those predicted by the consensus models. If the predicted returns are better than the consensus models, then inefficiencies in the market are identified.

The underlying aspect of quantification is the reduction of the "understanding of textual disclosure" into comparable numerical metrics. In other words, one has to aggregate the information contained in a large amount of text into numeric variables. What is important in such a reduction is the assurance that a valid metric is obtained for most texts, such that a comparison of the company across time or across its peers should be possible. This would improve the generalization of the empirical results, and the larger sample sizes obtained using this approach significantly increase the power of the empirical tests, which is critical for testing hypotheses such as stock market efficiency with respect to accounting information.

Figure 7:
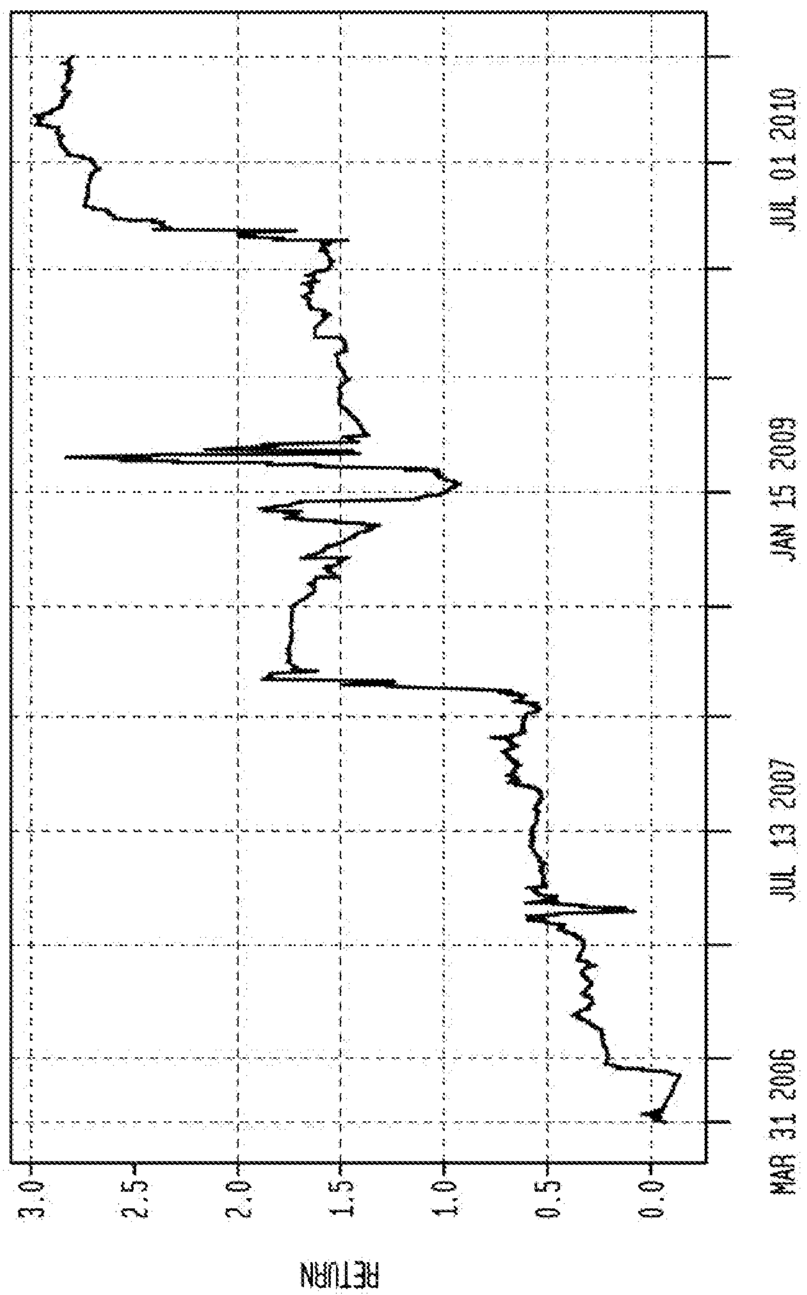
FIG. 7 is a result of exemplary trading method corresponding to one or more embodiments of the disclosure.
Figure 8:
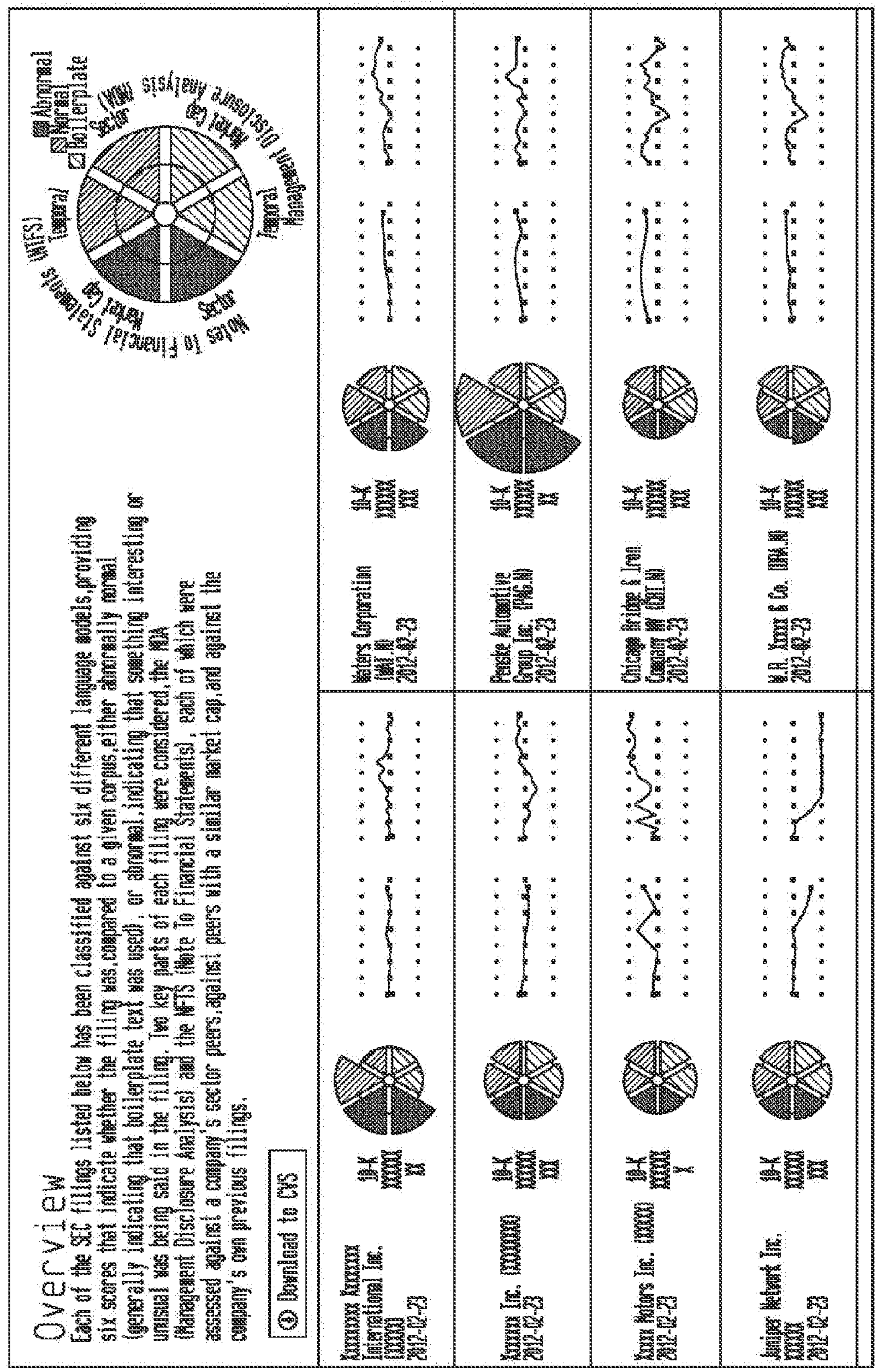
FIG. 8 is an exemplary interface which corresponds to one or more embodiments of the disclosure.

In one example, a trading strategy is created shorting companies with the most abnormal language scores. The net result is that a trading strategy as simple as just shorting companies with the most abnormal language scores for the MD&A section obtains significant returns of about three hundred percent in a period of four years. As seen in FIG. 7, most of the returns are obtained in the earnings season, hence showing that the strategy is betting on the signal.

The underlying aspect of quantification is the reduction of the "understanding of textual disclosure" into comparable numerical metrics. In other words, one has to aggregate information contained in a large amount of text into numeric variables. What is important in such a reduction is the assurance that a valid metric is obtained for most texts, such that a comparison of the company across time or across its peers should be possible. This would improve the generalization of the empirical results, and the larger sample sizes obtained using this approach significantly increase the power of the empirical tests, which is critical for testing hypotheses such as stock market efficiency with respect to accounting information.

FIGS. 1 through 13 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s) (including the contents of the documents cited and incorporated by reference herein), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A computer-implemented method comprising:

analyzing a first cluster of conceptually-related portions of text to identify a probability for each of the one or more portions of texts within the first cluster of conceptually-related portions of text, wherein the first cluster of conceptually-related portions of text comprises one or more financial documents and each of the one or more financial documents comprises one or more financial document sections and each of the one or more financial document sections comprises one or more sentences, and wherein the probability is calculated based on the number of occurrences of a given token of a given sentence of a given financial document of the first cluster of conceptually-related portions of text;

developing a model based on the one or more probabilities corresponding to the one or more portions of texts within the first cluster of conceptually-related portions of text;

calculating an abnormality score for each of the one or more sentences of the one or more financial document sections of a first identified conceptually-related portion of text as compared to the model; and transmitting a second identified conceptually-related portion of text based upon the abnormality score satisfying a threshold.

2. The method of claim 1, wherein the first cluster of conceptually-related portions of text is generated by aggregating one or more financial documents according to an assigned key value.

3. The method of claim 2, wherein the assigned key value is a time period of a given financial document.

4. The method of claim 2, wherein the assigned key value is a sector for a given financial document.

5. The method of claim 2, wherein the assigned key value is a market cap for a given financial document.

6. The method of claim 1, wherein the second identified conceptually-related portion of text comprises one or more sentences identified as atypical.

7. The method of claim 1, wherein the second identified conceptually-related portion of text comprises one or more sentences identified as typical.

8. A system comprising:

a processor;

a memory coupled to the processor; and a processing program stored in the memory for execution by the processor, the processing program comprising:

an analysis module, the analysis module configured to analyze a cluster of conceptually-related portions of text to identify a probability for each of the one or more portions of texts within the first cluster of conceptually-related portions of text, wherein the first cluster of conceptually-related portions of text comprises one or more financial documents and each of the one or more financial documents comprises one or more financial document sections' and each of the one or more financial document sections comprises one or more sentences, and wherein the probability is calculated based on the number of occurrences of a given token of a given sentence of a given financial document of the first cluster of conceptually-related portions of text and to develop a model based on the one or more probabilities corresponding to the one or more portions of texts within the first cluster of conceptually-related portions of text;

a novelty module, the novelty module configured to calculate an abnormality score for each of the one or more sentences of the one or more financial document sections of a first identified conceptually-related portion of text as compared to the model; and a transmission module, the transmission module configured to transmit a second identified conceptually-related portion of text based upon the abnormality score satisfying a threshold.

9. The system of claim 8, wherein the first cluster of conceptually-related portions of text is generated by aggregating one or more financial documents according to an assigned key value.

10. The system of claim 9, wherein the assigned key value is a time period of a given financial document.

11. The system of claim 9, wherein the assigned key value is a sector for a given financial document.

12. The system of claim 9, wherein the assigned key value is a market cap for a given financial document.

13. The system of claim 8, wherein the second identified conceptually-related portion of text comprises one or more sentences identified as atypical.

14. The system of claim 8, wherein the second identified conceptually-related portion of text comprises one or more sentences identified as typical.

* * * * *